(12) United States Patent
Larson

(10) Patent No.: US 7,376,661 B2
(45) Date of Patent: May 20, 2008

(54) XML-BASED SYMBOLIC LANGUAGE AND INTERPRETER

(75) Inventor: Cole Larson, Gardnerville, NV (US)

(73) Assignee: Wings Software, Ltd, Gardnerville, NV (US)

( * ) Notice: Subject to any disclaimer, the term of this patent is extended or adjusted under 35 U.S.C. 154(b) by 284 days.

(21) Appl. No.: 11/003,794

(22) Filed: Dec. 3, 2004

(65) Prior Publication Data

US 2006/0123048 A1 Jun. 8, 2006

(51) Int. Cl.
*G06F 7/00* (2006.01)
*G06F 9/44* (2006.01)

(52) U.S. Cl. .............................. 707/101; 707/6; 707/7; 717/108; 717/115; 717/116; 717/143

(58) Field of Classification Search .............. 707/1–10, 707/100, 200, 101; 717/108, 115, 116, 143
See application file for complete search history.

(56) References Cited

U.S. PATENT DOCUMENTS 6,754,884 B1* 6/2004 Lucas et al. ................. 717/108
7,178,149 B2 2/2007 Hansen

FOREIGN PATENT DOCUMENTS

WO WO0173546 A2 4/2001
WO WO03090078 A2 10/2003

OTHER PUBLICATIONS

Choi et al., The XQuery Formal Semantics: A Foundation for Implementation and Optimization, May 31, 2002, pp. 1-15.*

International Search Report for PCT/US2005/043742.
International Preliminary Report on Patentability for PCT/US2005/043742.
XQuery 1.0 and XPath 2.0 Data Model (XDM), W3C Recommendation Jan. 23, 2007.
XQuery 1.0 and XPath 2.0 Functions and Operators, W3C Recommendation Jan. 23, 2007.
Implementing XQuery 1.0: The Story of Galax; PowerPoint Document; http://www.galaxquery.com/slides/xsym2004.pdf.
Genetic Programming—Wikipedia; http://en.wikipedia.org/wiki/Genetic_programming, Jul. 22, 2007.
McCarthy, John, Recursive Function of Symbolic Expressions and Their Computation by Machine, Part I, MIT Apr. 1960.

* cited by examiner

*Primary Examiner*—Jean B. Fleurantin
*Assistant Examiner*—Fred I Ehichioya
(74) *Attorney, Agent, or Firm*—Law Office of R. Alan Burnett

(57) ABSTRACT

An XML-based symbolic computer language, interpreter, and corresponding execution environments are disclosed. The XML-based symbolic computer language, called "OLIN" (One Language Intelligent Network) enables a computer program to be written as an XML-compliant document. OLIN programs are interpreted by an interpreter by parsing the XML content to extract symbolic expressions embedded therein, and evaluating those symbolic expressions. The XML-based symbolic computer language is object-oriented and is based on inherent principles of the LISP programming language. Accordingly, code and data are treated the same. The language provides built-in structures and functions for implementing neural networks and genetic programming. OLIN programs may be executed by a single computer, or via a multiprocessing environment, including distributing processing environments and multiprocessor computers.

16 Claims, 27 Drawing Sheets

NUMBER Class

| Class Properties | | Class Methods |
|---|---|---|
| -None- | Derived From: 118 | Standard methods available to all NUMBER objects. |

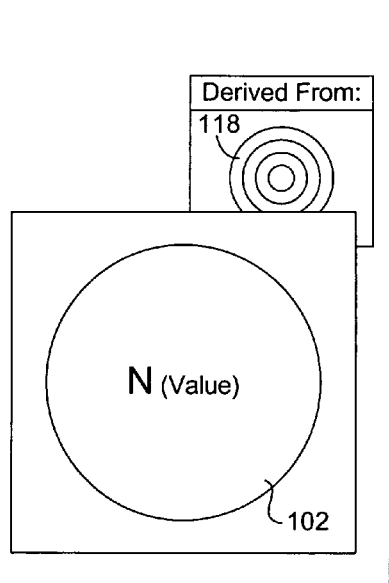

N (Value)
102

| Instance Properties | Description | Instance Methods |
|---|---|---|
| Numerator<br>Denominator | A NUMBER object is used for all numerical values. It does not require user declaration of a number type, but rather employs an single "infinite precision" type. | -None- |

*Fig. 5*

CELL Class

| Class Properties | | Class Methods |
|---|---|---|
| -None- | Derived From: 116 | -None- |

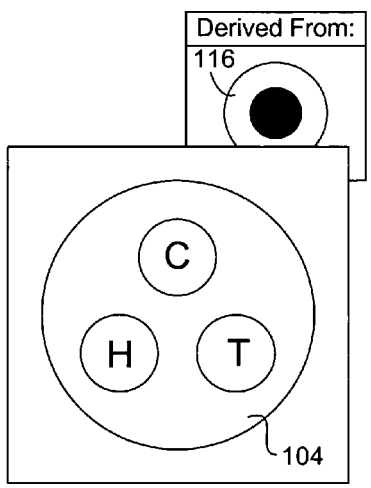

104

| Instance Properties | Description | Instance Methods |
|---|---|---|
| Head Object<br>Collection Instance<br>Tail Object | CELL objects are used to construct collections. They typically point to the collection instance they belong to, the head object in the collection and to another CELL that contains the 'tail' of the collection.<br><br>CELL Objects can be thought of as the glue that binds objects into collections. | -None- |

*Fig. 6*

COLLECTION Class

| Class Properties | | Class Methods |
|---|---|---|
| -None- | Derived From: 118 | Standard Methods available to all COLLECTION instances. |

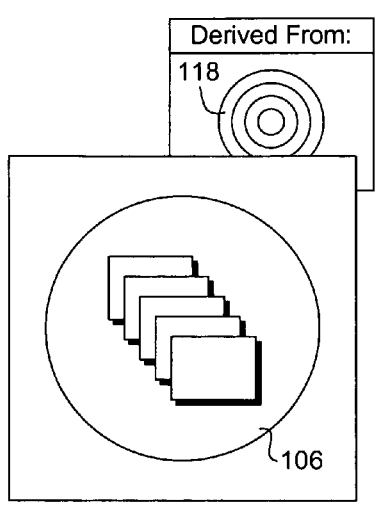

106

| Instance Properties | Description | Instance Methods |
|---|---|---|
| Collection Class Attributes Collection | The COLLECTION class is used to group symbols and numbers together. Each collection is associated with a collection class from which it inherits its name.<br><br>A collection typically consists of the elements contained inside an XML expression. | -None- |

*Fig. 7*

COLLECTION_CLASS Class

| Class Properties | | Class Methods |
|---|---|---|
| Collection Type Flags | Derived From: 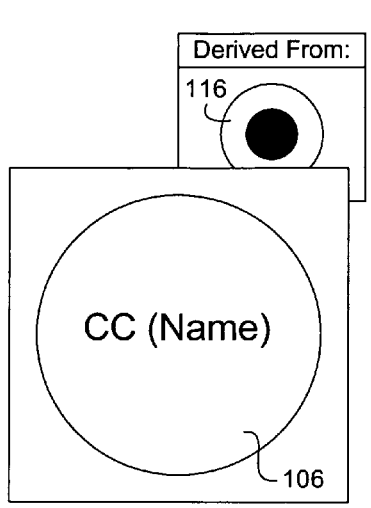 | -None- |

| Instance Properties | Description | Instance Methods |
|---|---|---|
| Class Name<br>Instance Collection<br>Last Collection Instance<br>Collection Type<br>Coll. Class Default Methods | This class defines a COLLECTION CLASS class. A Collection Class object refers to a named grouping of objects that can occur multiple times.<br><br>Typically, the name of a Collection Class object is equivalent to the name of an XML tag. | -None- |

*Fig. 8*

SYNAPSE Class

| Class Properties | | Class Methods |
|---|---|---|
| -None- | Derived From: 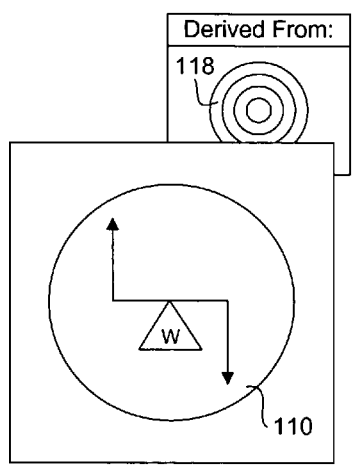 118  110 | Methods that apply to all Synapse objects. |

| Instance Properties | Description | Instance Methods |
|---|---|---|
| Synapse<br>Target Object<br>Number Value | A SYNAPSE is a weighted connection between two objects.<br><br>SYNAPSE are used by the neural network methods to determine the value of a target object from a source object.<br><br>SYNAPSE are contained in a specialized collection called a NEURON. | -None- |

*Fig. 9*

NEURON Class

| Class Properties | | Class Methods |
|---|---|---|
| -None- | Derived From: 118  112 | Standard methods that apply to all NEURON objects. |

| Instance Properties | Description | Instance Methods |
|---|---|---|
| Source Object<br>Neuron Collection | A NEURON is a specialized collection of SYNAPSE, optimized for neural network processing. | -None- |

Example #1 - Basic Symbol
hello
Step 1 (Read) - Symbol Object Created
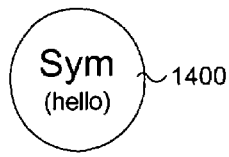
Step 2 (Read) - RunMethods Collection & Value Method Created
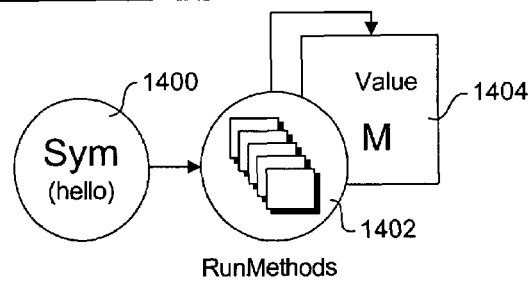
Step 3 (Read) - Parameter Collection Generated
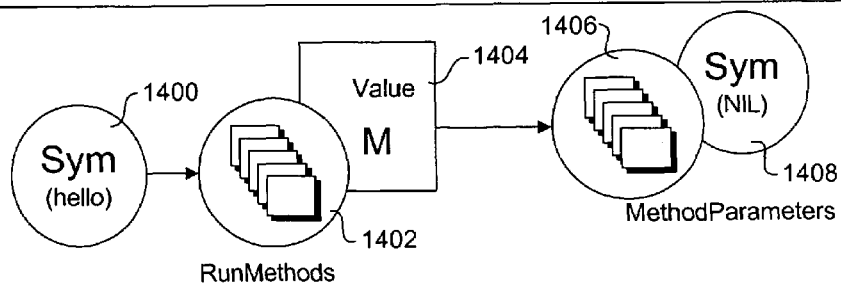
*Fig. 14a*

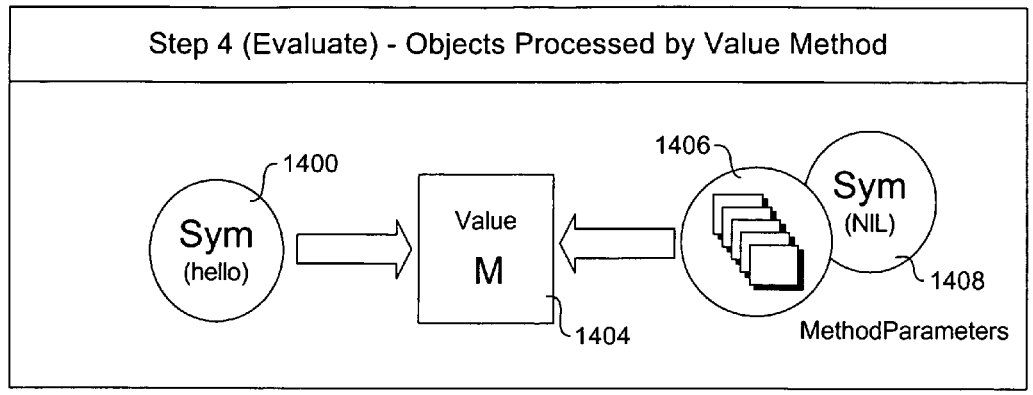
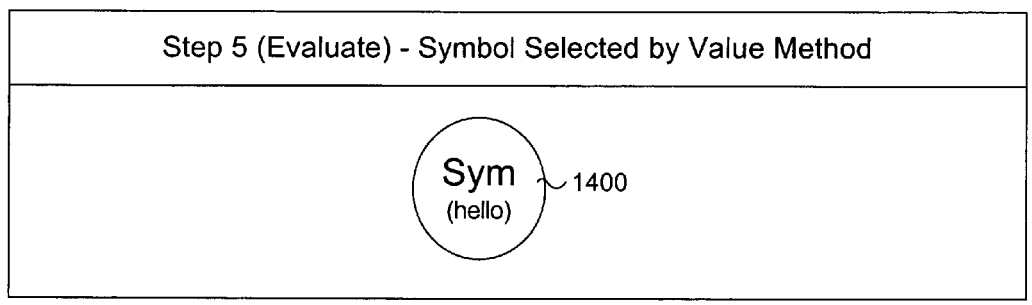
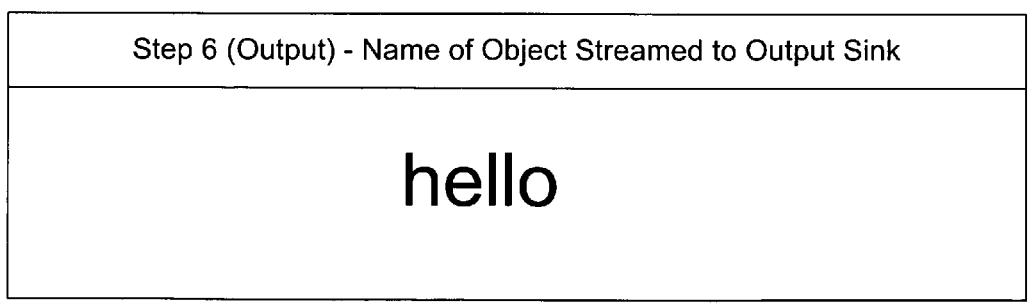
Fig. 14b

| Example #2 - Basic Symbol with method and parameter |
| --- |
| hello\|Upcase_0 |
| Step 1 (Read) - Symbol Object Created |
| --- |
| 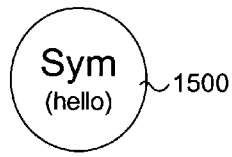 |
| Step 2 (Read) - RunMethods Collection & Upcase Method Created |
| --- |
| 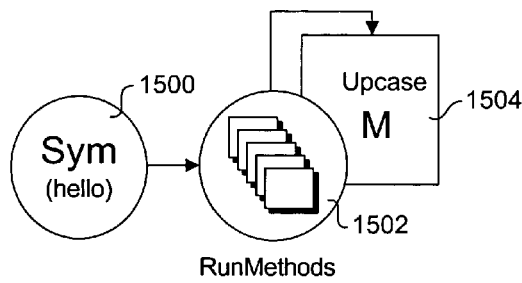 |
| Step 3 (Read) - Parameter Collection Generated |
| --- |
| 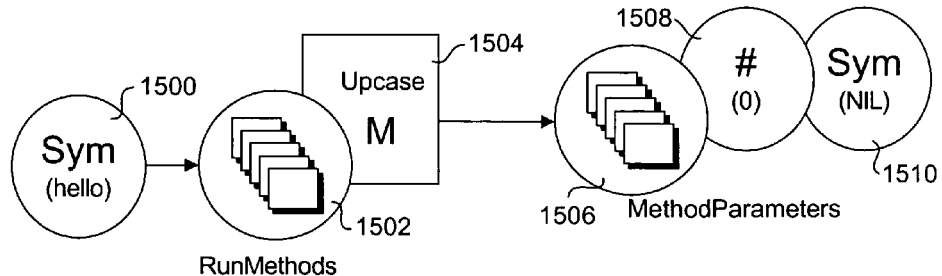 |
*Fig. 15a*

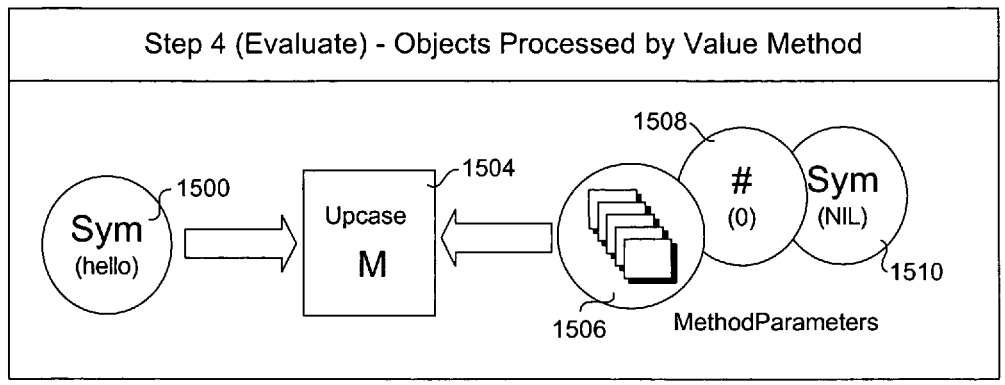
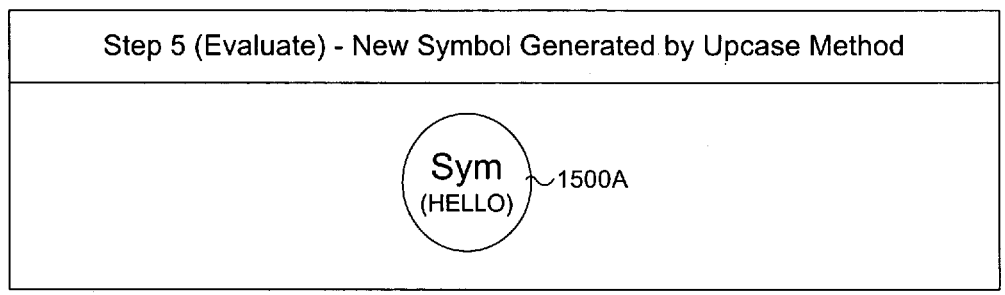
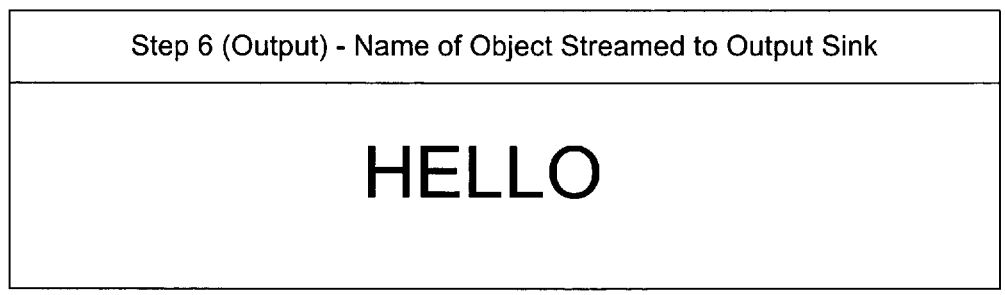
*Fig. 15b*

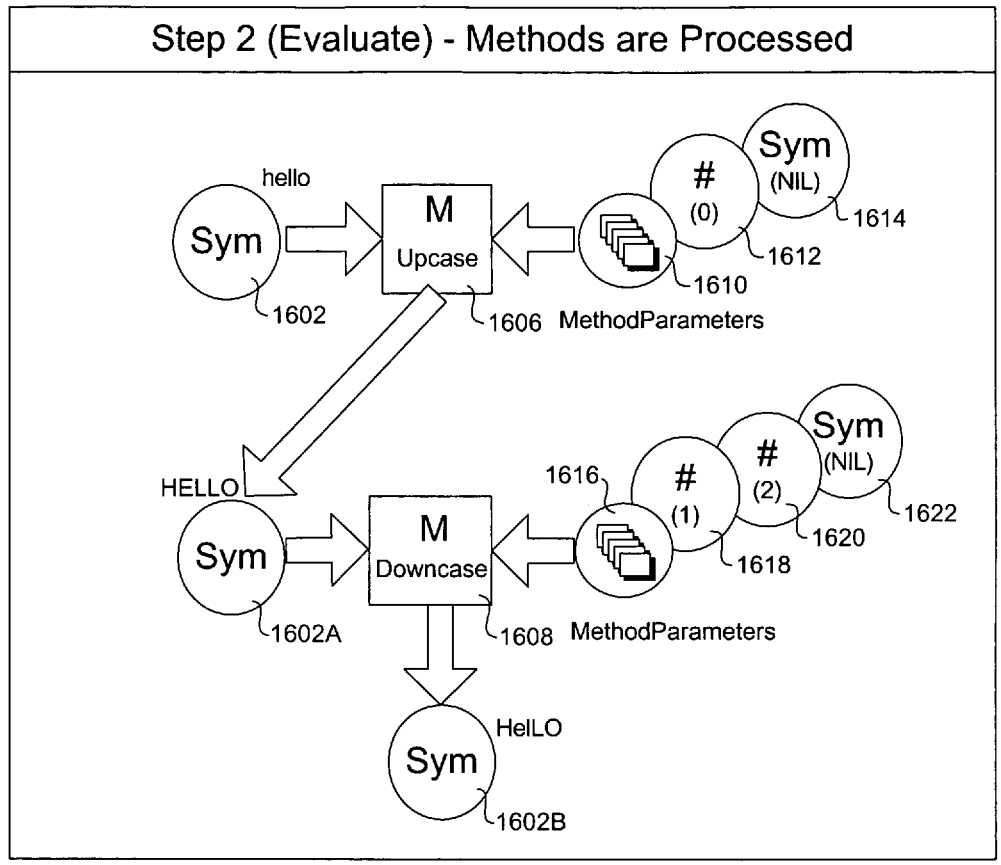
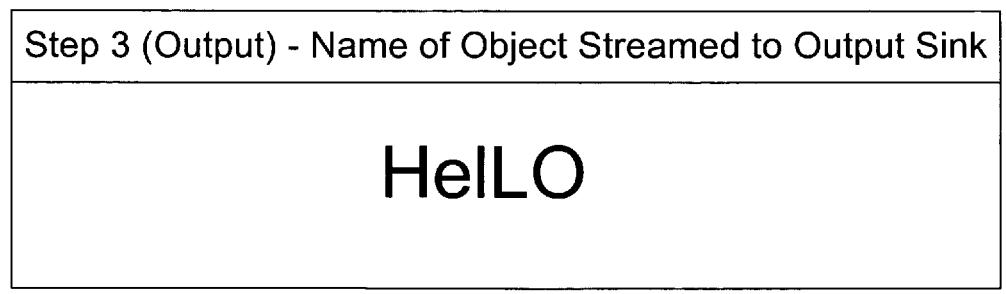
*Fig. 16b*

| Example #4 - Namespace, Symbol, Method and Parameter |
|---|
| Dictionary:hello\|Definition_0 |

| Step 1(Network Search) - Dictionary Process Located on OLIN Network |
|---|
|  |

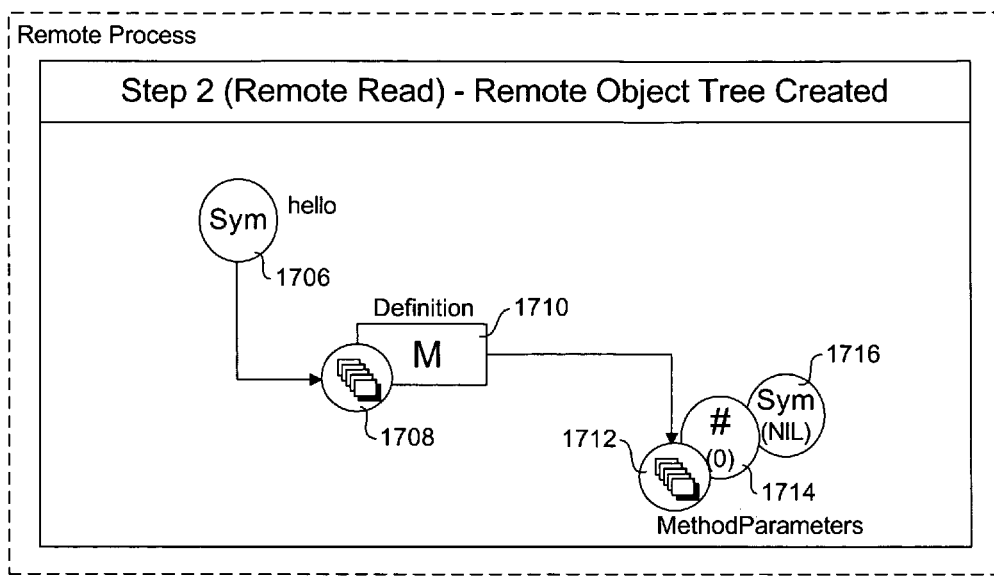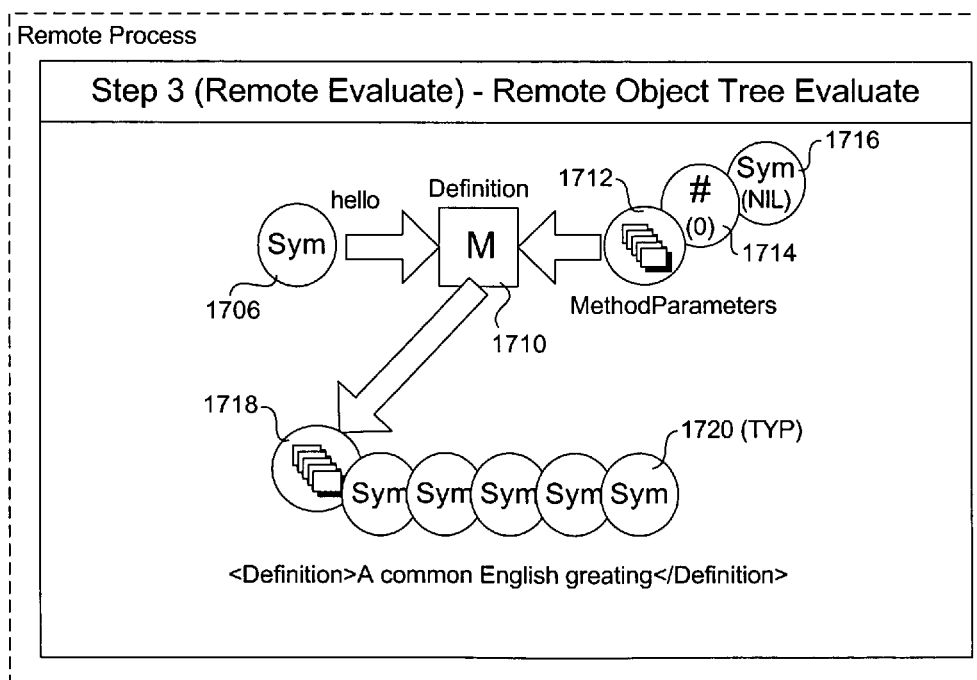
Fig. 17b

XML-BASED SYMBOLIC LANGUAGE AND INTERPRETER

FIELD OF THE INVENTION

The field of invention relates generally to computer languages and their use, and, more specifically but not exclusively relates to a symbolic computer language based on XML and corresponding interpreter and execution environments.

BACKGROUND INFORMATION

Extensible Markup Language (XML) is fast becoming the de facto standard for data exchange across diverse networks and computing platforms. XML is a technology concerned with the description and structuring of data. It is platform, operating system, and network architecture independent, meaning any XML document following XML's syntax rules can be read by any XML-compliant parser running any operating system on any platform, and that the XML document may be sent over the network via any network protocol. For example, an XML document can be authored by someone using, e.g., a UNIX workstation and read by others using substantially any computing platform, such as a PC, Apple Macintosh, or workstation, etc, and running any operating system that includes built-in support for XML, or on which an XML parser can run, such as Microsoft Windows, UNIX, LINUX, MAC OS-10, etc.

XML comprises a mark up language that is a subset of SGML (Standard Generalized Markup Language). SGML is a text-based language that can be used to mark up data—that is, add metadata—in a way that is self-describing. The most widely known application of SGML is HyperText Markup Language, or HTML. Generally, HTML comprises a specific vocabulary that is used as a universal markup language for the display of information, and the linking of different pieces of information.

In many respects, XML is similar to HTML. Both are based on tagged markup elements, enabling XML documents to be easily generated using a standard, well-known syntax. However, unlike HTML, XML does not provide a direct mechanism for defining the display and layout (e.g., tables, frames, layout information, etc.) of data. Rather, as a data exchange mechanism, these features are not needed. At first, this may seem like a limitation. However, the data contained in XML documents can be displayed in a variety of different manners, including extracting the data from a document and displaying the extracted data using a predefined or custom user interface, and transforming the XML document with various types of style sheets, including Cascading Style Sheets (CSS) and Extensible Style Sheet Language—Transformation (XSLT) style sheets.

Although very powerful as a data-exchange mechanism, XML by itself also does not provide direct programming abilities. In fact, the term "language" in its name is a bit of a misnomer, as XML does not provide inherent support for "normal" computer language functionality, such as procedural elements, recursion, looping, etc. Although style sheets may be written to include procedural logic (e.g., conditions, branching, loops, etc.) to be applied to an XML document, such operations are generally limited to data extracting, formatting, and display. Furthermore, under such a scenario the programming and data elements are not contained in a single document, but rather require at least two separate documents.

SUMMARY OF THE INVENTION

In accordance with aspects of the present invention, an XML-based symbolic computer language, interpreter, and corresponding execution environments are disclosed. The XML-based symbolic computer language, called "OLIN" (One Language Intelligent Network) enables a computer program to be written as an XML-compliant document. OLIN programs are interpreted by an interpreter by parsing the XML content to extract symbolic expressions embedded therein, and evaluating those symbolic expressions. Roughly, the OLIN Interpreter can be viewed as XML with the addition of Methods. The contents between tags are viewed as a collection of symbols. The symbol collection is an instance of a collection class that is named for the tag. The XML-based symbolic computer language is object-oriented and is based on inherent principles of the LISP programming language. Accordingly, code and data are treated the same. The language provides built-in structures and functions for implementing neural networks and genetic programming. OLIN programs may be executed by a single computer, or via a multiprocessing environment, including distributing processing environments and multiprocessor computers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 shows a NUMBER class definition corresponding to the XML-based object-oriented symbolic language;

FIG. 6 shows a CELL class definition corresponding to the XML-based object-oriented symbolic language;

FIG. 7 shows a COLLECTION class definition corresponding to the XML-based object-oriented symbolic language;

FIG. 8 shows a COLLECTION_CLASS class definition corresponding to the XML-based object-oriented symbolic language;

FIG. 9 shows a SYNAPSE class definition corresponding to the XML-based object-oriented symbolic language;

FIGS. 14a and 14b collectively illustrate a process diagram corresponding to the processing of an exemplary s-expression comprising a basic Symbol having a value of "hello";

FIGS. 15a and 15b collectively illustrate a process diagram corresponding to the processing of an exemplary s-expression comprising a basic Symbol with a Method and parameter;

FIGS. 16a and 16b collectively illustrate a process diagram corresponding to the processing of an exemplary s-expression comprising a basic Symbol with two Methods and parameters;

FIGS. 17a, 17b, and 17c collectively illustrate a process diagram corresponding to the processing of an exemplary s-expression comprising a Namespace, Symbol, Method and parameter;

DETAILED DESCRIPTION OF PREFERRED EMBODIMENTS

Figure 1:
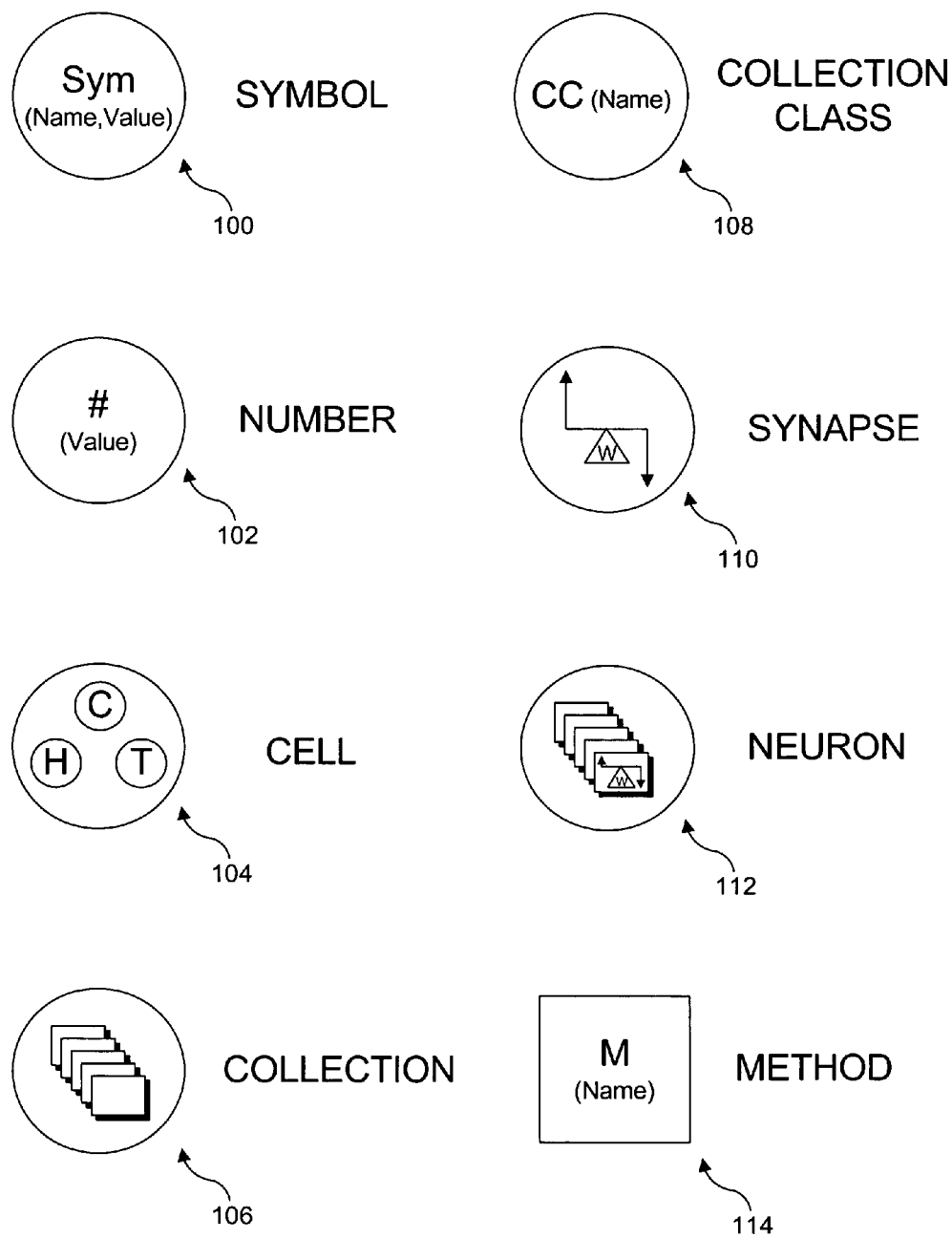
FIG. 1 is a schematic diagram illustrating a legend of various objects types that are implemented the OLIN XML-based object-oriented symbolic language interpreter in accordance with an embodiment of the invention.

Embodiments of an XML-based language, corresponding interpreter, and use of the language and interpreter are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, a framework comprising various components and features of an XML-based symbolic computer language and interpreter are disclosed herein. The framework, known as OLIN (One Language Intelligent Network), provides support for a symbolic computer language based on XML, and includes an interpreter called the "OLIN Interpreter." OLIN stands for ONE LANGUAGE INTELLIGENT NETWORK: ONE LANGUAGE refers to the use of XML syntax throughout; INTELLIGENT refers to the native neural network subsystem; and NETWORK refers to the ability of a running instance of the interpreter to intercommunicate with other running instances of the interpreter over a computer network. Since the language is based on XML syntax, it is platform, operating system, and network independent. Furthermore, OLIN documents are completely valid XML documents.

In one respect, the OLIN Interpreter can be viewed as XML with the addition of Methods. The contents between tags are viewed as a collection of symbols. The symbol collection is an instance of a collection class that is named for the tag. For example:

<SENTENCE>The quick brown fox jumps over the lazy dog</SENTENCE> is viewed as a collection of symbols of collection class "SENTENCE". Methods may be applied to a collection or to elements within the collection. For example:

<SENTENCE.VerbTense>The quick brown fox jumps over the lazy dog</SENTENCE> might produce:

<VerbTense>present Jump Jumps</VerbTense>

Any XML tagged expression can be parsed and interpreted by the language. No special tags are required. The power of OLIN lies in its ability to symbolically represent any XML expression.

There is really no special doctype implementation of an XML application underlying OLIN. Rather, methods may be associated with symbols and symbol collections that exist in any pre-existing arbitrary XML document. There is, however, a set of conventions that describe how methods may be explicitly invoked within the XML notation.

One feature of the OLIN interpreter that makes it possible to parse and interpret any arbitrary XML document is the notion of Default Methods. Default methods are defined for collection classes and automatically invoked at run time by the interpreter. This makes it possible to interpret and execute instructions based on XML derived without any knowledge about OLIN itself.

In one aspect, OLIN is an interpreted language based upon the inherent principals of LISP. This means that data and code are treated the same. OLIN is also object-oriented. All OLIN statements incorporate the notions of CLASS, CLASS INSTANCES, Class Properties called ATTRIBUTES and methods called CLASS FUNCTIONS. The Class/Instance paradigm is implemented to work natively with XML constructs and provide the conceptual power of object oriented programming. The OLIN Interpreter is structured so that many instances of it may function collaboratively on different computing resources in a rich, multiprocessing, networked environment. Messaging, process control and data exchange are all performed using XML based syntax. OLIN also provides fundamental structures and functions for supporting Neural Networks. These networks can be viewed as powerful functions that transform XML structures. Furthermore, the OLIN function set includes fundamental support for Genetic Programming procedures.

The OLIN interpreter reads a Symbolic Expression (s-expression) from an input source (typically the interpreter console.) An OLIN s-expression may consist of a Symbol, a Number or a Collection. A Symbol is a character string delimited by whitespace characters (like spaces.) A number is a correctly formatted number delimited by whitespace characters and a Collection is a set of symbols, numbers or collections formatted using XML conventions delimited by whitespace. For Example:

| | |
|---|---|
| Symbol: | foo |
| Number: | 1234 |
| Collection: | <Sentence>I see spot run.</Sentence> |

The interpreter scans the s-expression and creates an object or a collection of objects that represents the terms of the expression and executes either a default method for each object or executes an explicitly specified method.

FIG. 1 shows a legend of OLIN object symbols. These symbols are used in the examples in the following Figures and represent instances of the OLIN foundation classes. The objects include a SYMBOL object 100, a NUMBER object 102, a CELL object 104, a COLLECTION object 106, a COLLECTION CLASS object 108, a SYNAPSE object 110, a NEURON object 112, and a METHOD object 114.

Figure 2:
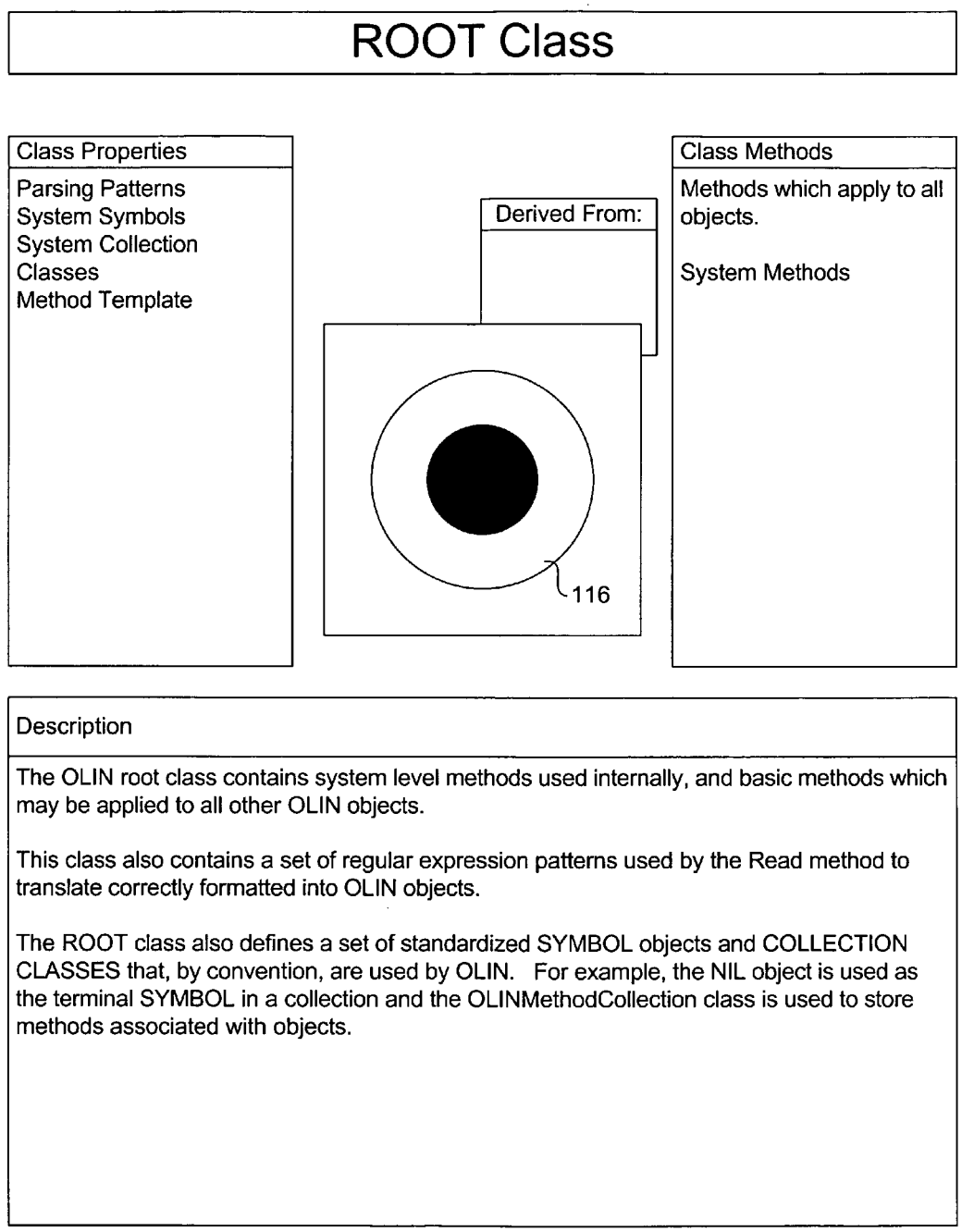
FIG. 2 shows a ROOT class definition corresponding to the XML-based object-oriented symbolic language.

Objects are associated with other objects via an object hierarchy. At the top or root of the hierarchy is a ROOT class. The definition for the ROOT class is diagrammatically shown in FIG. 2. The OLIN ROOT class contains system level methods used internally, and basic methods that may be applied to all other OLIN objects. The ROOT class also contains a set of regular expression patterns used by the READ method to translate correctly formatted OLIN objects. The ROOT class also defines a set of standardized SYMBOL objects and COLLECTION CLASSES that, by convention, are used by OLIN. For example, the NIL object is used as the terminal SYMBOL in a collection and the OLINMethodCollection class is used to store methods associated with objects. The legend symbol for the ROOT class is depicted at 116.

Figure 3:
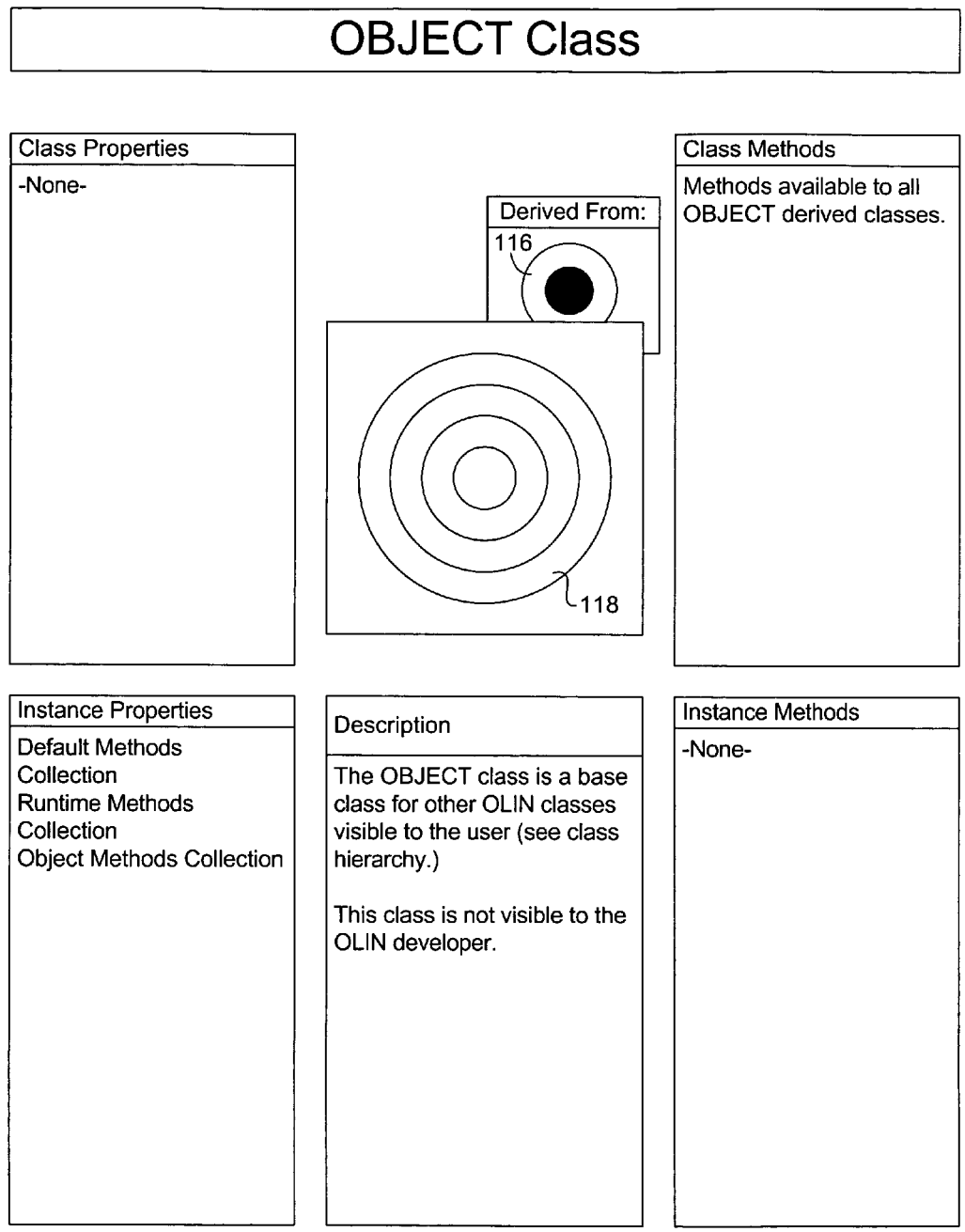
FIG. 3 shows a OBJECT class definition corresponding to the XML-based object-oriented symbolic language.

A definition of the OBJECT class is illustrated in FIG. 3. The OBJECT class is a base class for other OLIN classes visible to the user. However, the OBJECT class is not visible to the OLIN developer. The legend symbol for the OBJECT class is depicted at 118.

Figure 4:
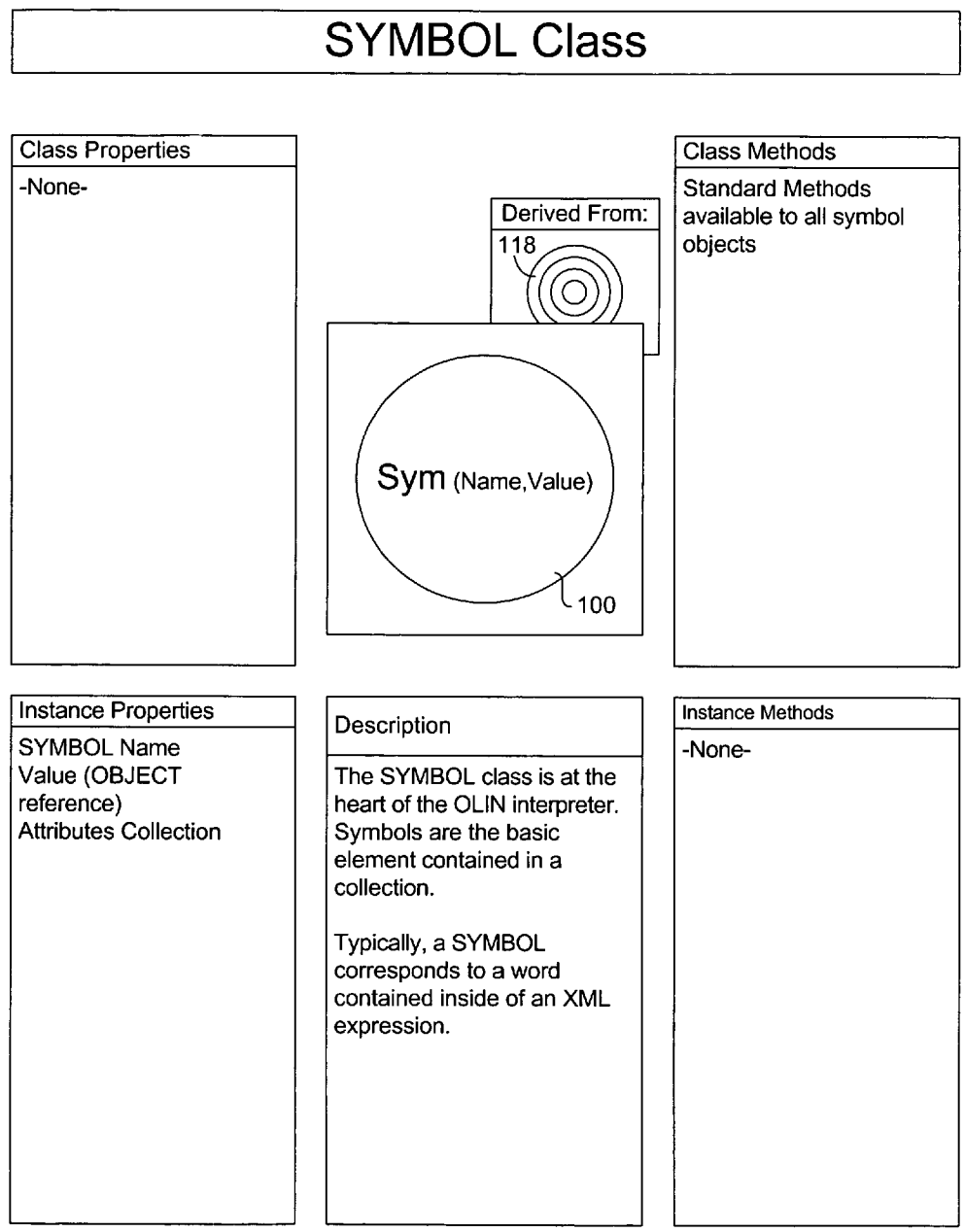
FIG. 4 shows a SYMBOL class definition corresponding to the XML-based object-oriented symbolic language.

The definition for the SYMBOL class is shown in FIG. 4. The SYMBOL class is at the heart of the OLIN interpreter. SYMBOLS are the basic element contained in a collection. The interpreter creates a SYMBOL object with its value set to itself and its name set to the name of the symbol. Typically, a SYMBOL corresponds to a word contained inside of an XML expression.

The definition for the NUMBER class is shown in FIG. 5. The interpreter creates a NUMBER object representing the number. In one embodiment, the interpreter uses an "infinite precision" math package internally, such that the programmer need not specifically declare a number type, such as integer, real, etc.

The definition for the CELL class is shown in FIG. 6, while definitions of the COLLECTION CLASS and the COLLECTION_CLASS class are shown in FIGS. 7 and 8, respectively. CELL objects are used to construct collections. The interpreter creates a COLLECTION by joining SYMBOLS, NUMBERS and other COLLECTIONS with a specialized linking object called a collection constructor CELL. Each CELL contains a reference to a HEAD object (H), a TAIL object (T), and the COLLECTION CLASS of the CELL (C). Each CELL references a COLLECTION CLASS (or CLS) object. CLS objects are created implicitly at the time a COLLECTION s-expression is read. Collection Classes may also be explicitly created.

Figure 10:
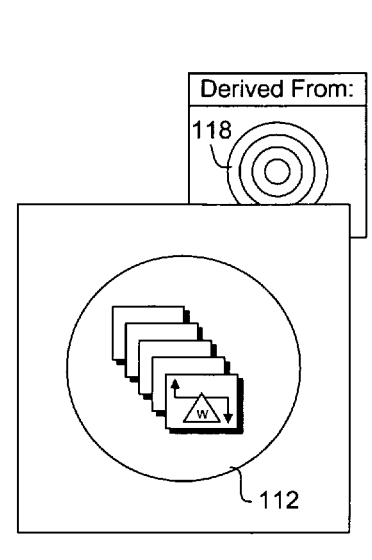
FIG. 10 shows a NEURON class definition corresponding to the XML-based object-oriented symbolic language.

Definitions for SYNAPSE and NEURON classes are shown in FIGS. 9 and 10, respectively. SYNAPSE and NEURON objects are used for neural network processing. A SYNAPSE is a weighted connection between two objects. SYNAPSES are used by the neural network methods to determine the value of a target object from a source object, as explained below in further detail. SYNAPSE are contained in a specialized collection called a NEURON, which is optimized for neural network processing.

Figure 11:
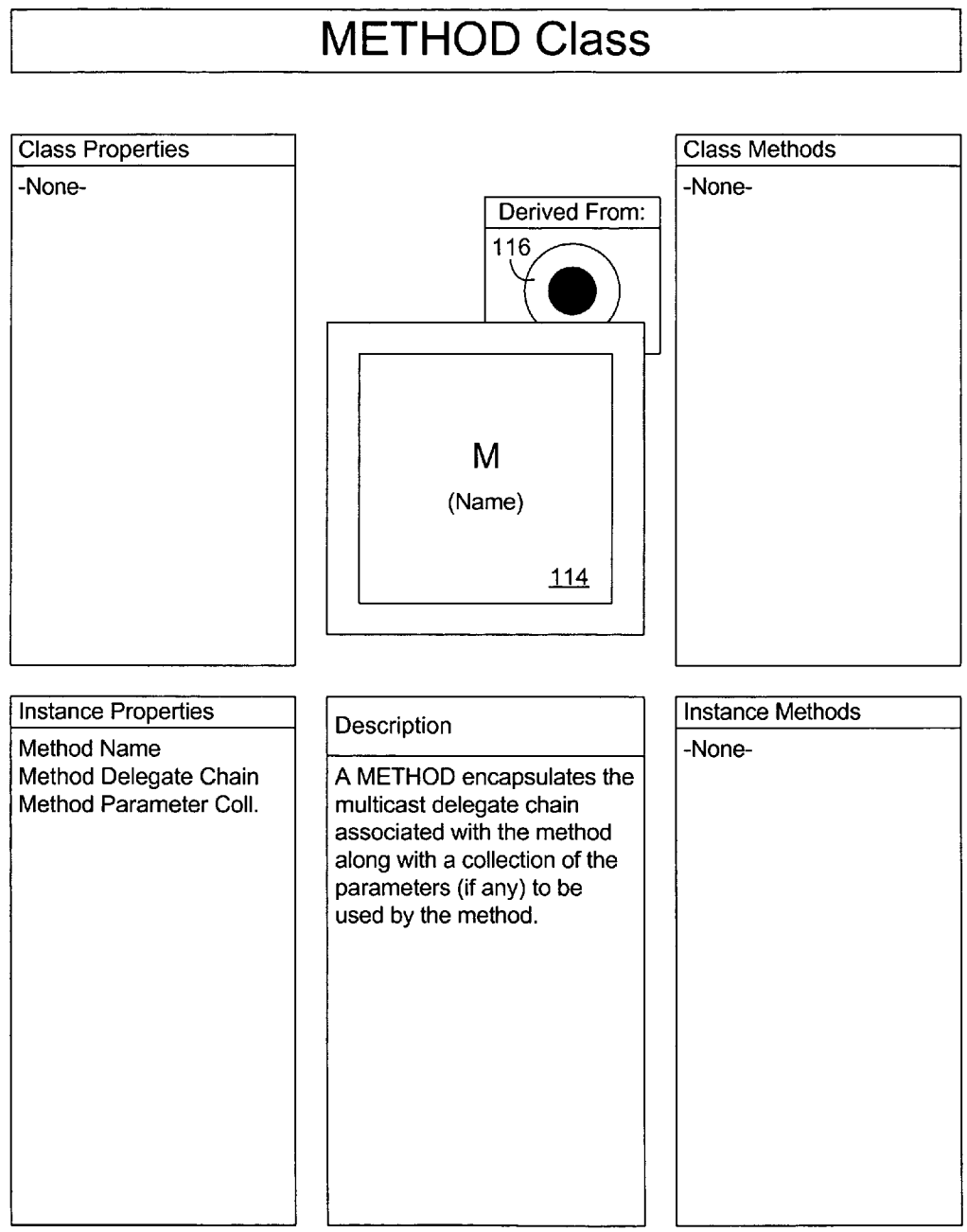
FIG. 11 shows a METHOD class definition corresponding to the XML-based object-oriented symbolic language.

The definition for the METHOD class is shown in FIG. 11. A method is a programmatic procedure performed upon an object. Methods may be implicitly inferred depending on the object itself, the kind of object or the class of the collection specified. Methods may also be explicitly specified within the syntax of the symbolic expression.

When no method is explicitly specified with the syntax of the s-expression, a search for the proper method is conducted by the interpreter. For symbols and numbers the following default method search is conducted:
 1.) The object is examined to determine if a default method for the object is available. If so, it is selected
 2.) The Symbol base class is next examined to determine if a default method is available. If so it is selected.
 3.) The root Obj base class is finally examined and the default method is selected.

For collections the following default method search is conducted;
 1.) The collection class for the specified collection is examined to determine if a default method is available for the class. If so, it is selected.
 2.) The CLS base class is examined for a default method. If one is available, it is selected.
 3.) The Obj base class is finally examined and the default method is selected.

The Obj base class must always specify a default method. The default method is set to the Value method which returns the value of an object. Methods may also be chained together using CELL objects of class "OLINMethods".

Figure 12:
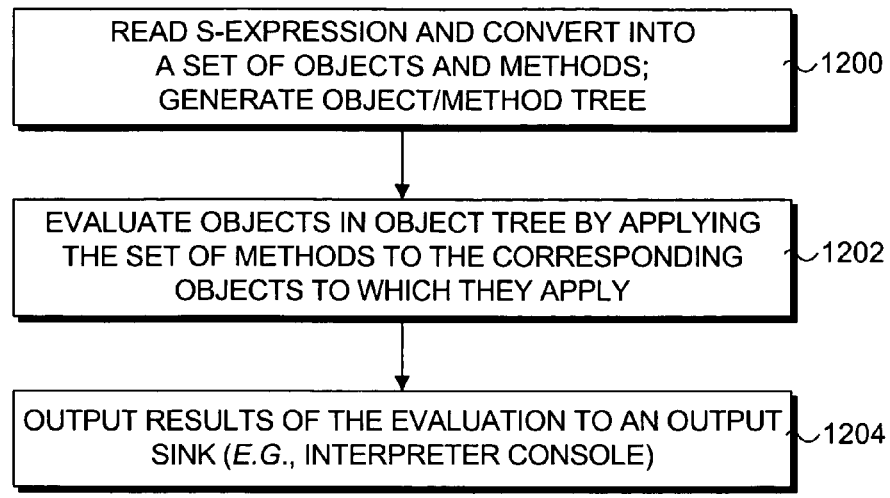
FIG. 12 is a flowchart illustrating high-level operations that are performed when processing an s-expression corresponding to the XML-based object-oriented symbolic language.

With reference to the flowchart of FIG. 12, the OLIN interpreter performs three steps in the evaluation of an s-expression. The first operation, as depicted in a block 1200, involves reading the s-expression and converting it into a set of object and methods, wherein the set of object and methods is generated in the form of an object tree. Next, in a block 1202, the objects in the object tree are evaluated by applying appropriate methods to corresponding objects to which they apply. The results of the evaluation are then output to an output sink, such as the interpreter console. This operation is shown in a block 1204.

Figure 13:
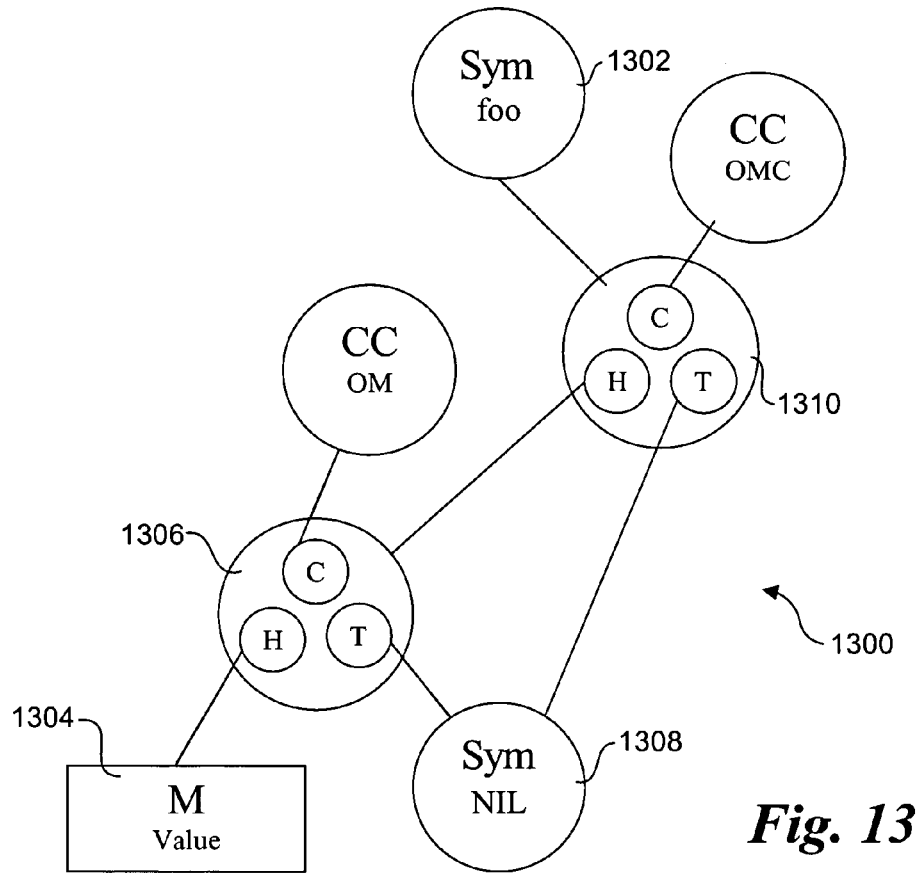
FIG. 13 is a schematic diagram illustrating an object/method tree that is generated during the processing of an exemplary s-expression comprising a single symbol.

An exemplary s-expression diagram 1300 corresponding to an s-expression of "foo" is shown in FIG. 13. During the read operation of block 1200, the following processing occurs. First, a "foo" Symbol object 1302 is created. A search for the default method is conducted, and the Value method is selected from the root Obj class. In response, a Method 1304 is constructed that reference the Value method. Next, a CELL 1306 of class OLINMethod (OM) is created. The Head reference is set to the Method 1304, while the Tail references set to a NIL Symbol 1308 because no method parameters are specified.

A CELL 1310 of Class OLINMethodCollection (OMC) is then created. The Head reference is set to the OLINMethod CELL 1306 (the CELL reference is pushed onto the OLINMethodCollection list.) The Tail reference is set to NIL since only one Method is implicitly specified. The read operations are then completed by passing a reference to the foo Symbol object to the EVALUATE portion of the interpreter.

During the EVALUATE operations of block 1202, the evaluator "pops" the first method from the OLINMethodCollection referenced by the object. The Method 1304 is then applied to the object. The resulting Object is passed to the interpreter OUTPUT operation. During the OUTPUT operation of block 1204, the Object is converted into its equivalent s-expression using the proper syntax. The s-expression is then output to a pre-selected output sink.

Syntax Basics

The basic s-expression syntax is:

{NAMESPACE:
   }SYMBOL{|METHOD{_PARAMETER1} . . .
   } . . .

wherein braces ({}) indicate optional items. For example, the syntax for a basic Symbol of "hello" is simply:

hello

An example of a basic Symbol with a method and a parameter is:

hello|Upcase_0 wherein Upcase is a method that operates on the Symbol hello and employs a parameter of "0."

An example of a basic Symbol with 2 methods and parameters is:

Hello|Upcase_0|Downcase_1_2

An example of an s-expression including a Namespace, Symbol, Method, and Parameter is:

Dictionary:hello|Definition_0

The processing steps and corresponding results during interpretation of the s-expression "hello" are shown in FIGS. 14a and 14b. The process starts by creating a Symbol object 1400 with the name "hello." In a second step, a RunMethods Collection 1402 and Value method 1404 are created. A Parameter Collection 1406 is then created during a third step, which includes a default NIL symbol 1408. In a fourth step, the objects are processed by Value method 1404. The Symbol object 1400 is then selected by the Value method during a fifth step, and the name of the object, "hello," is streamed to the output sink during a sixth step to complete the process.

The processing steps and corresponding results during interpretation of the s-expression "hello|Upcase_0" are shown in FIGS. 15a and 15b. In a manner similar to that described above, a Symbol object 1500 with a name of "hello." During a second step, a RunMethods Collection 1502 and Upcase method are created, while in a third step a parameter Collection 1506 is created. Note in this instance, the parameters include a number object 1508 with a value of 0 in addition to the default NIL Symbol 1510. Evaluation begins during a fourth step, wherein the objects are processed by the Upcase method, and is completed during a fifth step, wherein a new Symbol object 1500A is generated with a name of "HELLO." The name of the object is then streamed to the output sink during a six and final step.

Figure 16A:
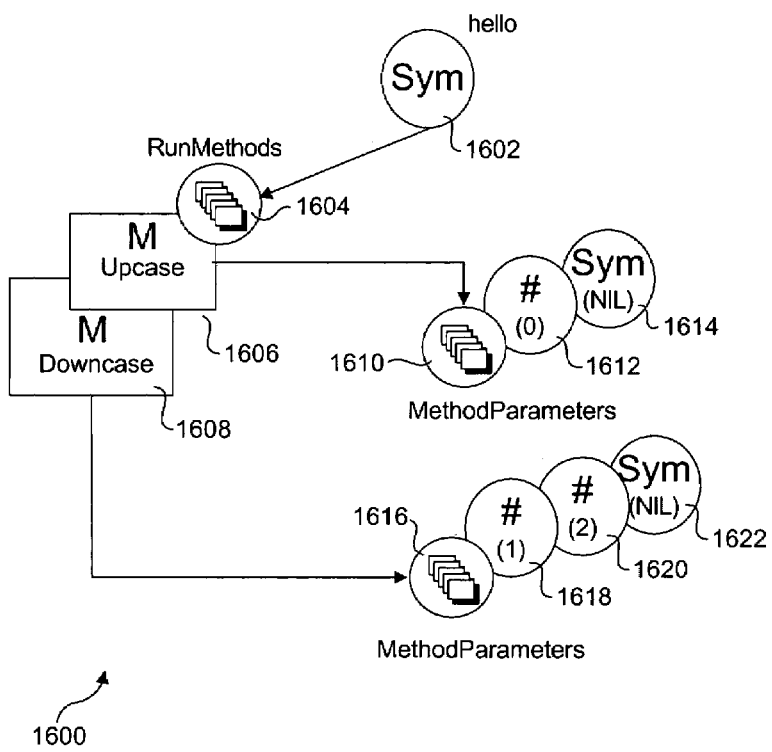

The processing steps and corresponding results during interpretation of the s-expression "hello|Upcase_0|Downcase_1_2" are shown in FIGS. 16a and 16b. For brevity, the operations are grouped into three steps, corresponding to blocks 1200, 1202, and 1204 of FIG. 12, respectively. During the first Read operation of block 1200, an object tree 1600 is generated. The object tree includes a Symbol object 1602, a RunMethods Collection 1604, an Upcase Method 1606 and a Downcase Method 1608. A parameters Collection 1610, including a number parameter 1612 and a NIL Symbol parameter 1614, is created for the Upcase method. A parameters Collection 1615, including number parameters 1618 and 1620 and NIL Symbol parameter 1622, is created for Downcase Method 1608.

Next, the evaluation operations of block 1202 are performed. When multiple methods are contained in an s-expression, the methods are applied to the object in a sequential manner, thereby enabling multiple transformation operations to occur on a single object using a single statement. This is illustrated in step 2 of FIG. 16b, wherein evaluation of the Upcase Method 1606 produces an intermediate Symbol object 1602A with a name of "HELLO,", which in turn is evaluated using Downcase Method 1608 to generate a Symbol object 1602B with a name of "HelLO." Number parameter 1618 tells the evaluator to skip 1 letter from the start of Symbol object 1602A and then number parameter 1620 tells the evaluator to convert the case of the next 2 letter to lowercase. The name of the resulting Symbol object 1602 ("HelLO" is then streamed to the output sink in a third step corresponding to the output operations of block 1204.

Figure 17A:
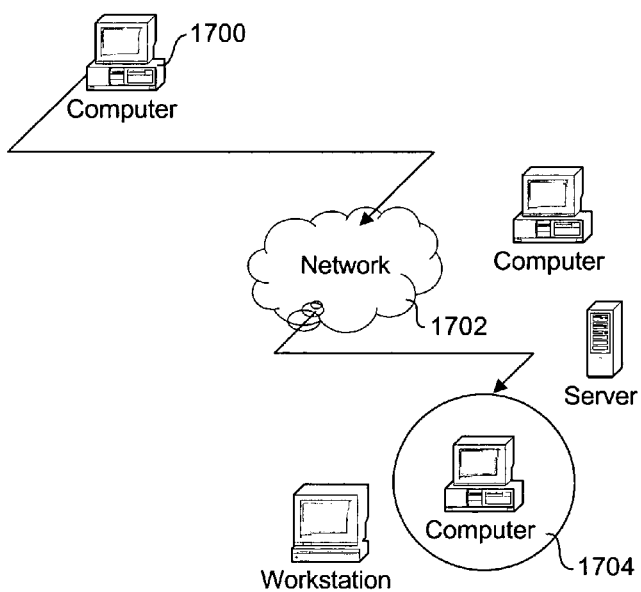
Figure 17C:
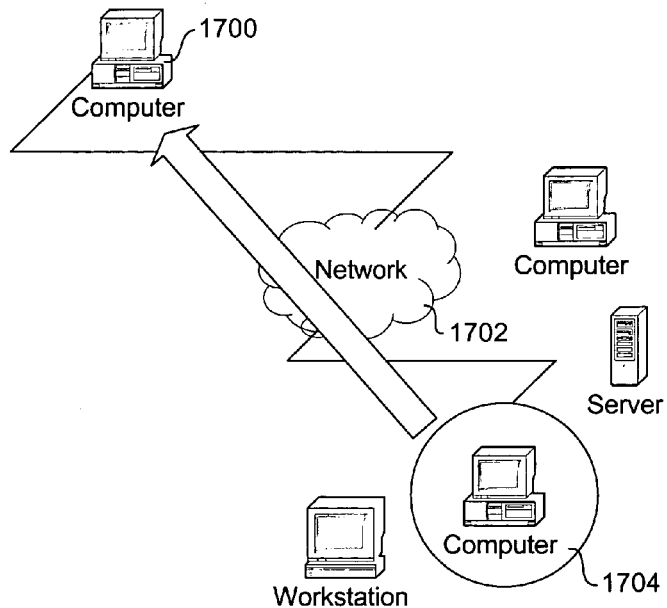

The processing steps and corresponding results during interpretation of the s-expression "Dictionary:hello|Definition_0" are shown in FIGS. 17a-c. As discussed above, this s-expression includes the declaration of a namespace, namely "Dictionary." The interpreter supports the XML Namespace concept. Classes may be grouped by namespace. By default, all classes are part of the namespace of the instance of the interpreter within which they are instantiated. New namespaces may be created by adding an xmlns attribute to the ROOT class. The following examples illustrate the use of XML namespaces:

The expression:

<X xmlns:FOO="http://FOO.ORG"> creates a new namespace ID "FOO" that may then be used in Class names.

The expression:

<X.1.5:FOO.0> refers to the 0 instance of FOO on instance 5 of an OLIN interpreter controlled by server 1. Namespaces for all instances of all OLIN interpreters are included at the root level by default.

The expression:

<BLETCH:FOO xmlns="http://FOO.ORG">

Allows classes from the FOO namespace to be used as subclasses within the BLETCH class.

The expression:

---

<BAR>
    <FOO:PERSON xmlns="http://FOO.ORG">
       <FOO:NAME> Fred <FOO:NAME>
    <FOO:PERSON>
<BAR>

---

Illustrates the explicit inline declaration of a namespace.

During a first step, a network search is performed to locate a remote host (i.e., computer or server) that is to perform the s-expression processing operations. The remote host is identified via the namespace value of "Dictionary." In this instance, a check is made to see if a local computer 1700 supports the "Dictionary" process. Once it is determined that local computer 1700 does not support the process, a search is made via a network 1702 to local a remote host that supports the process. In the illustration of FIG. 17a, a computer 1704 is depicted as supporting the "Dictionary" process.

The next two steps shown in FIG. 17b are performed on the remote host. First, a remote object tree is created on computer 1704. The object tree includes a Symbol object 1706, a Method Collection 1708, a Definition Method 1710, a parameters Collection 172, a Number object 1714 and a NIL Symbol 1716. As shown in the lower part of FIG. 17b, a remote object tree evaluation is performed to produce an output of "<Definition>A common English greeting,</Definition>." This is stored as a Collection 1718 comprising a plurality of Symbols 1720. The resulting remote objects (i.e., Collection 1718) are then copied back to caller computer 1700 during a fourth step. The value of the collection is then sent to the output sink of caller computer 1700 to complete the process.

Processing Model

The OLIN Interpreter operates in one of two modes: RUN Mode or STATIC Mode. In RUN Mode, the interpreter processes functions in a serial stream in the traditional way. In STATIC Mode, the interpreter stops processing data in serial mode, maintains all structures in memory and reacts to external messages from other instances of the OLIN Interpreter (either in RUN MODE or in STATIC MODE.) The interpreter is also in static mode when it is waiting for user interaction.

The process that connects to a remote STATIC MODE process locks the remote process upon connection and removes the lock upon disconnection. In this way, only one remote process may connect to a STATIC MODE process at any time.

Interpreter Instances

Interpreter Instances are numbered using a two-part addressing scheme called the INSTANCE ID. An INSTANCE ID is defined by two infinite precision numbers. The first integer is a SERVER ID (SID), the second is a unique Instance ID (IID) within SERVER ID. The format of this ID is:

SID:IID

INSTANCE IDs are assigned by a standalone process called the OLIN INSTANCE SERVER. This process keeps track of all OLIN Instances for its cluster of OLIN instances. Each OLIN INSTANCE SERVER is assigned a unique integer by the SERVER AUTHORITY. The SERVER AUTHORITY is an agency that assigns unique SERVER ID's.

Instance Server

The primary responsibility of the INSTANCE SERVER is to spawn instances of the OLIN Interpreter on computing resources over which it has authority. It does this by receiving a valid XML document containing the following XML element;

```
<X pass="password", nickname="name", resourceID="ID", state="state">
    <XEDITOR resourceID="ID", name="name", state="state"/>
    <XLISTNER resourceID="ID", name="name", state="state"/> (...)
    <XDEBUGGER resourceID="ID", name="name", state="state"/>
    <LOGFILE> (an XLINK) </LOGFILE>
    <XSTATS/>
</X>
```

If the XML is validated by the Instance Server it spawns the OLIN Interpreter instance and returns an XML of the following form;

```
<X.SID.IID>
    <XEDITOR> (an XLINK to the editor) </XEDITOR>
    <XLISTNER> (an XLINK to a listner) </XLISTNER> (...)
    <XDEBUGGER> (an XLINK to the debugger) </XDEBUGGER>
    <LOGFILE> (an XLINK to the logfile) </LOGFILE>
    <XSTATS> (other important processing statistics</XSTATS>
</X.SID.IID>
```

In addition to spawning instances of the OLIN interpreter, the INSTANCE SERVER is responsible for monitoring the processing state of each instance, for locking STATIC instances of the interpreter, for mediating connections between interacting process instances, for passing messages and results from one instance to another and for other record keeping tasks. If an instance of the interpreter interacts with another instance on a remote CLUSTER, the INSTANCE SERVER mediates these interactions by communicating with a REMOTE INSTANCE SERVER.

Static Mode Processes

Static mode OLIN Interpreter processes can be viewed as instantiated, classified XML data structures residing on remote resources. These resources may be used for such things as neural networks, XML databases, control data or other resources that may need to respond to the needs of utilizing instances of the OLIN Interpreter.

A Static process may also be put into Run Mode by a calling instance. In this case, a remote process may be viewed as a parallel processing resource that may be used for a variety of purposes such as parsing remotely available XML structures or working on an independent aspect of a processing problem. These remote processes may interact with other remote process or with people in fluid and dynamic ways.

The only caveat on the use of a remote process is that a calling process may not terminate a connection to the remote processes until it is once again in Static Mode or it has itself terminated. When in Static Mode, the resident XML structures can be viewed as instantiated class instances. The functions of the Classes may be thought of as Class Methods called using an object-messaging model. The attributes associated with each XML tag may be viewed as instance properties. The XML element may be viewed as a list of symbols upon which OLIN functions may operate.

Processing Model Goals

It is envisioned that remote OLIN interpreter instances transition between Run Mode and Static mode dynamically as the network of OLIN interpreter instances works out a processing problem. It is also envisioned that the network of all instances of the OLIN Interpreter form and break connections very dynamically.

The ultimate goal of the multiprocessing OLIN Interpreter is that it act as a very dynamic intelligent processing network where code and data are treated the same and where XML is the Language of this intelligent processing network. This treatment allows for the development of wholly new dynamic processing paradigms using a globally accepted interchange format (XML.) For example, the LISP-like treatment of code and data makes this paradigm uniquely suited to the techniques of Genetic programming—the interpreter may generate new XML that is then processed natively by the interpreter in subsequent processing steps, in a recursive manner. The multi-processing model, the code and data parity, the inclusion of parallel processing elements at a fundamental level and the ability to manipulate code genetically all within a consistent data interchange format offers the prospect of a major processing paradigm shift.

Basic Exemplary Execution Environment and OLIN Program Processing

Figure 18:
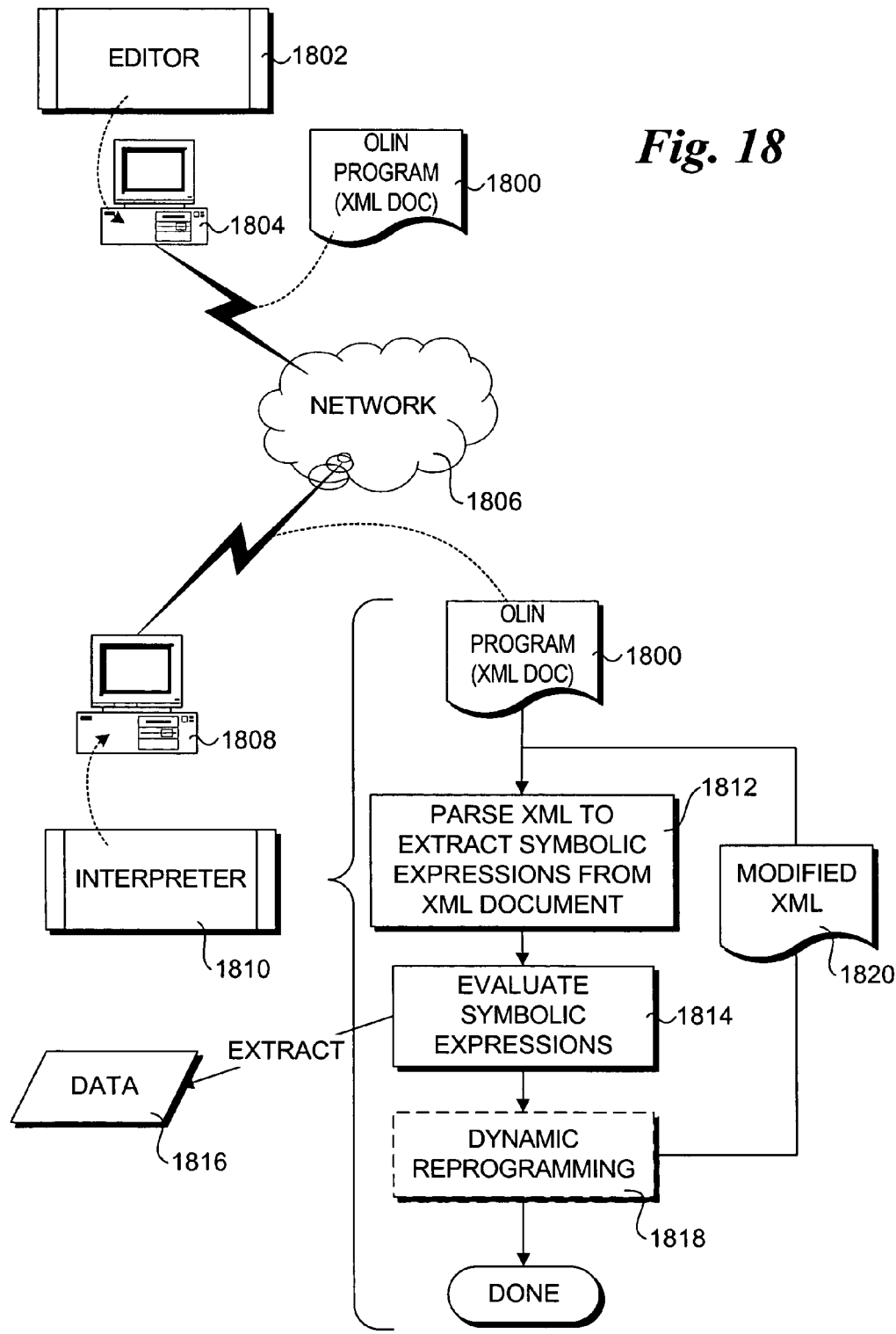
FIG. 18 is a schematic diagram illustrating an exemplary execution environment for processing an OLIN program.

A basic execution environment illustrating the processing of an OLIN program is shown in FIG. 18. The process begins by generating an XML document comprising an OLIN program 1800 via an editor 1802 running on a computer 1804. Preferably, the editor will provide XML compliancy checking features, but this is not required. Recall from above that OLIN programs are self-contained XML-compliant documents. In another instance, computer 1804 comprises a computer server on which a previously written OLIN program XML document is stored.

Next, the OLIN program XML document 1800 is sent over a network 1806 via a standard network transport, such as HTTP, to a receiving computer 1808. Optionally, the document may be sent over other transport mechanisms, such as FTP, Kermit, etc. Generally, network 1806 may comprise any type of computer network, including a local area network (LAN), a wide area network (WAN), or the Internet. In one instance, the OLIN program XML document is forwarded to the receiving computer by an operator of computer 1804, e.g., via a push service, as an e-mail attachment, via a broadcast, etc. When computer 1804 functions as a server, the server sends the OLIN program XML document in response to a request from caller computer 1808.

An interpreter instance 1810 is running on caller computer 1808. Upon receiving the document, the interpreter instance parses the XML to extract symbolic expressions delineated by XML tags, as depicted by a block 1812. The extracted symbolic expressions are then evaluated in a block 1814. This process is similar to the interpretation process of a LISP program. Nested symbolic expressions are evaluated from the inside out, until all of the symbols for a given expression have been evaluated to return an atomic result, as depicted by extracted data 1816. It is noted that in many instances, the result of one expression will be used by one or more other subsequently evaluated expressions, wherein the resulting symbol values are maintained in memory and not extracted per se. As with LISP, symbolic expressions are reprogrammable—that is, a particular symbolic expression may contain or reference one or more methods (functions) that are used to rewrite that symbolic expression or other symbolic expressions in the OLIN program. This enables support for dynamic reprogramming, or "genetic" programming, as depicted by an optional block 1818. Dynamically reprogrammed elements 1820 are then reinterpreted in a recursive manner, as a function of the programmed logic, until program interpretation operations are completed.

Multiprocessing Environment Example

Figure 19:
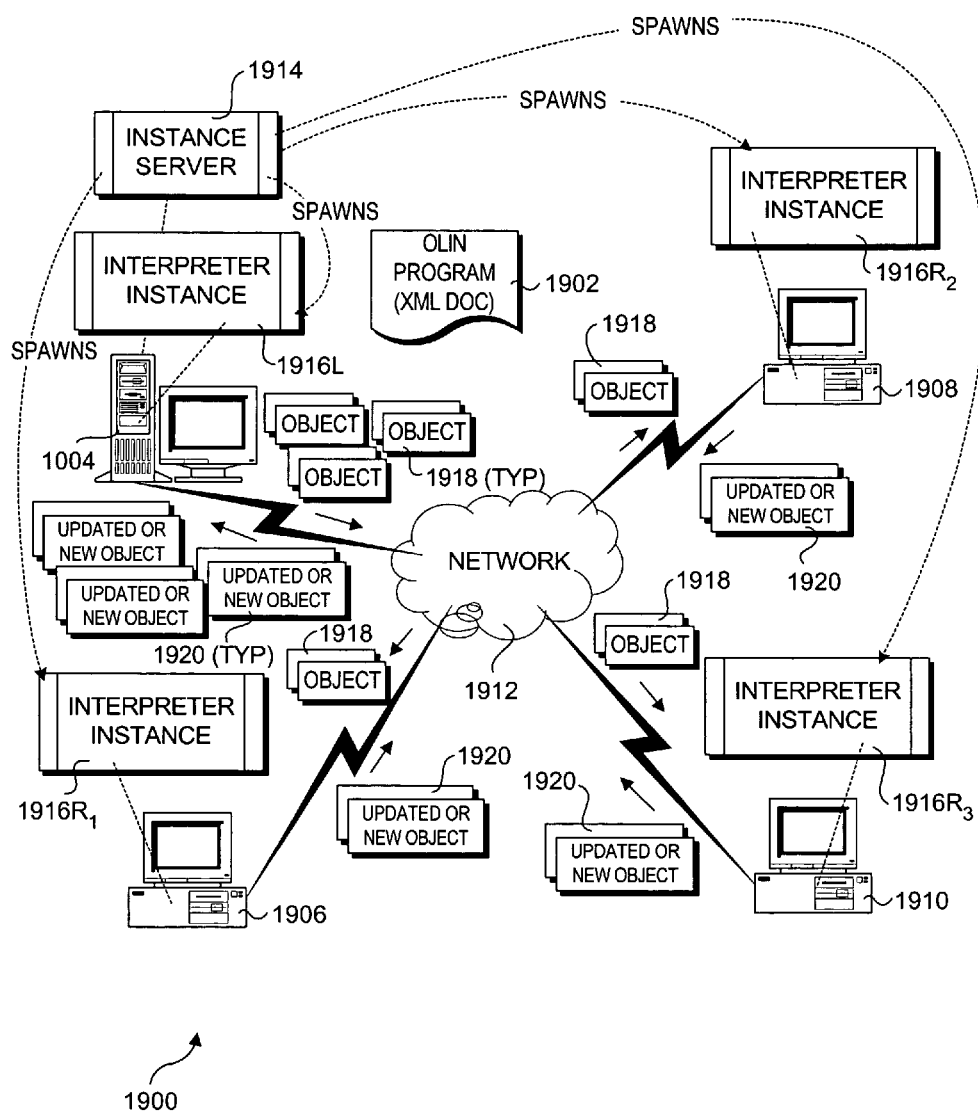
FIG. 19 is a schematic diagram illustrating a first implementation of a multiprocessing execution environment in which a distributed set of networked computing resources are employed.

An exemplary multiprocessing execution environment 1900 for concurrent execution of an OLIN program 1902 is shown in FIG. 19. The environment includes a local processing resource comprising a server 1904 and a plurality of remote processing resources comprising clients 1906, 1908, and 1910, all linked in communication via a network 1912. This configuration, which is generally known as a distributed (processing) environment, is also referred to herein as a cluster.

An INSTANCE SERVER 1914 is running on server 1904. The INSTANCE SERVER is used to spawn OLIN interpreter instances on the local resource (e.g., server 1904) and the remote resources (e.g., clients 1906, 1908, and 1910). As discussed above, in addition to spawning instances of the OLIN interpreter, the INSTANCE SERVER is responsible for monitoring the processing state of each instance, for locking STATIC instances of the interpreter, for mediating connections between interacting process instances, for passing messages and results from one instance to another and for other record keeping tasks. During initialization, the INSTANCE SERVER spawns a local interpreter instance 1916L on server 1904. The INSTANCE SERVER and the local interpreter instance work cooperatively to manage execution of OLIN program 1902, which begins at the start of the XML document.

Typically, if an OLIN program is to be executed via a distributed processing environment, the OLIN program will contain explicit instructions (within its symbolic expressions) for doing so. Generally, these instructions may identify particular remote resources (e.g., a remote client or server) on which distributed portions of the program execution processes are to be performed. Optionally, the OLIN program may be written such that available remote resources are determined at run-time, and execution of the program processes is distributed among those available resources.

In accordance with a predetermined resource implementation in which explicit instructions for distributed processing on identified resources are included in OLIN program 1902, INSTANCE SERVER 1914 spawns corresponding remote interpreter instances $1916R_1$, $1916R_2$, and $1916R_3$ on clients 1906, 1908, and 1910, respectively. Interpreter instance 1916L initially operates in RUN mode. Interpreter instances $1916R_1$, $1916R_2$, and $1916R_3$ run in STATIC mode.

Typically, in a distributed execution environment, the local interpreter instance and INSTANCE SERVER controls execution and distributed processing for an OLIN program. Upon encountering a symbolic expression containing either a reference to one or more remote objects (the object themselves), or a method or methods that operate on such objects, data corresponding to the objects or methods are passed to the remote processing resource. Oftentimes, a remote processing resource may be employed for a specific task, such as a database or data store. Accordingly, many of the tasks these resources perform may be predefined via OLIN programming instructions corresponding to an OLIN program document already stored on the remote resource. In other instances, processes are dynamically passed to remote resources during the OLIN program run-time.

Generally, collections of objects will be passed to a remote resource, such as depicted by objects 1918. (It is noted that in one embodiment, both object-oriented objects, as would be conventionally understood, and corresponding object-oriented methods are both considered "objects" by the interpreter). Upon receiving the collection of objects, and via coordination by the INSTANCE SERVER (e.g., processing locking, etc.), the interpreter instance on the remote resource will perform applicable processing defined by the object collection and/or predefined program instructions, and return updated or new objects 1920 back to the caller (i.e., the local interpreter instance). These updated or new objects may then be employed during subsequent processing of the OLIN program. This process is continued in a similar manner until execution of the OLIN program is completed.

Figure 20:
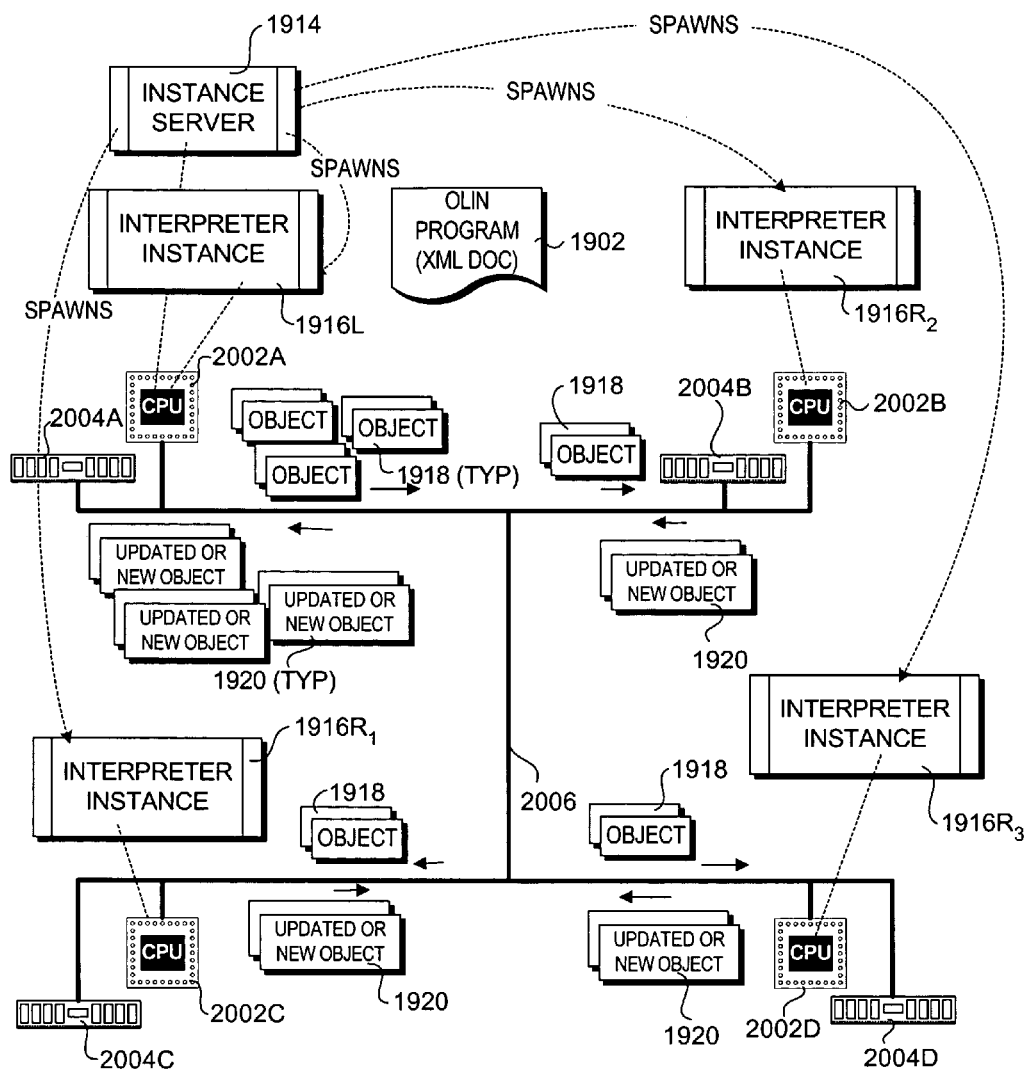
FIG. 20 is a schematic diagram illustrating a second implementation of a multiprocessing execution environment in which a single computer having multiple processors is employed.

In another type of multiprocessing environment, a single computer system containing a plurality of processors is employed, such as illustrated by a multiprocessor environment 2000 shown in FIG. 20. Effectively, a multiprocessor environment operates in a similar manner to a distributed environment except that each processing resource now comprises a processor 2002 (A-D) and memory 2004 (A-D) managed by respective interpreter instances, and the computer network is replaced by a computer bus 2006 connecting the processors and memory. In this configuration, one of the processors will run the INSTANCE SERVER and local interpreter instance, while the other processors will operate as remote resources running remote interpreter instances.

Generally, there will not be a need for network communication operations, as interpreters can pass objects amongst themselves via the computer bus. In practice, this is accomplished by passing data between respective interpreter threads. Optionally, a pseudo-networking scheme may be implemented, wherein networking transport calls are employed via a pseudo network layer to pass objects between interpreters in a manner that appears to those interpreters as if they were actually running on separate computers and transferring data over a network, rather than operating on processors in the same computer.

Application in Neural Networks

As discussed above, the OLIN interpreter and computer language has built-in facilities for implementing neural networks. Neural networks are typically employed to solve complex problems or model complex functions, and are modeled after biological neural systems, such as the human brain. As with the brain, neural networks learn by example. The neural network user gathers representative data, and then invokes training algorithms to automatically learn characteristics of that data. Neural networks are applicable in situations in which a relationship between the predictor variables (independent variables, i.e., inputs) and predicted variables (dependent variables, i.e., outputs) exists, even when that relationship is very complex and difficult to model or articulate.

Figure 21:
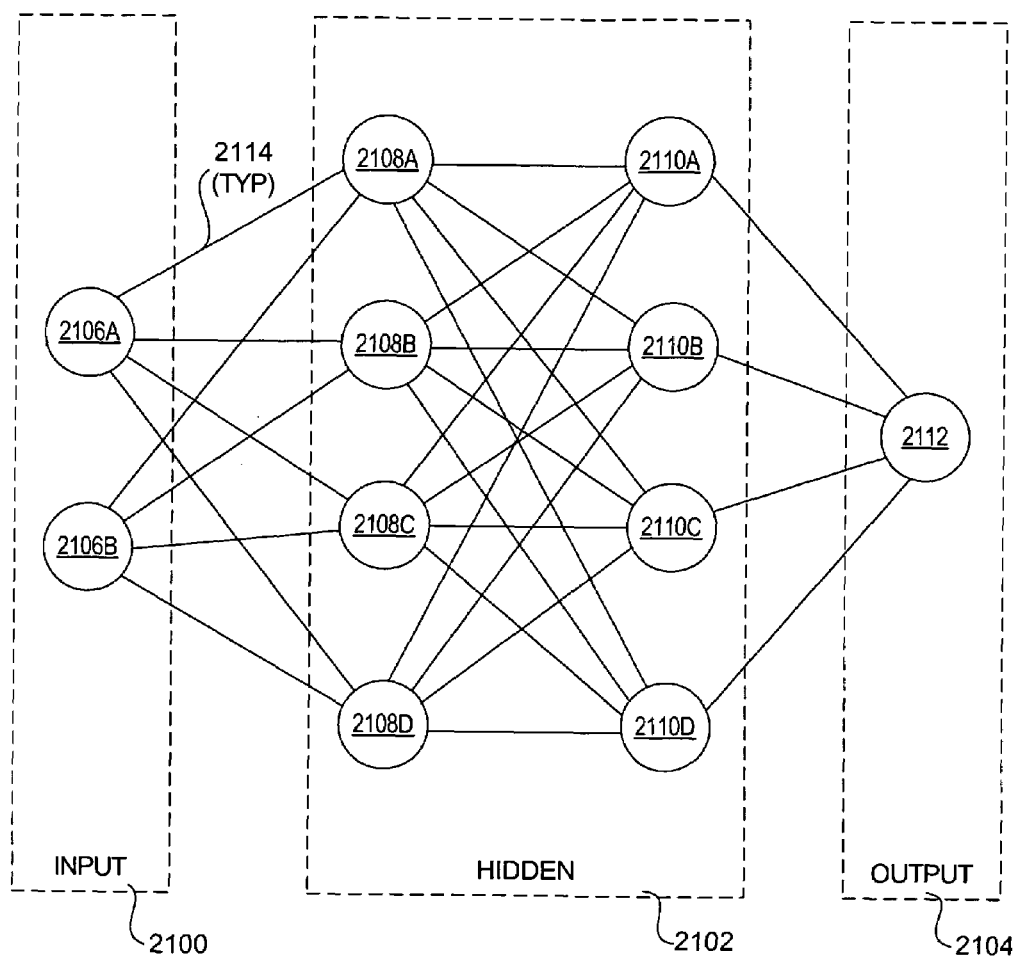
FIG. 21 is a schematic diagram of a generalized exemplary neural network.

A generalized neural network implementation is shown in FIG. 21. The neural network includes a plurality of neurons configured in three layers: an input layer 2100, a "hidden" layer 2102, and an output layer 2104. The input layer contains will contain one or more input neurons. Input layer 2100 includes a pair of input neurons 2106A and 2106B. Generally, the hidden layer will include one or more columns of neurons. For example, hidden layer 2102 includes two columns of neurons labeled 2108A-D and 2110A-D. Finally, the output layer will contain one or more output neurons, such as a neuron 2112 in output layer 2104.

The various neurons are interconnected via lines called "synapses." These are shown in FIG. 21 as synapses 2114. Under conventional neural networks, each synapse has a corresponding "weight" assigned to it. This provides a weighting scheme whereby the effect of the outputs received by a given neuron will be a function of each output's value multiplied times the weight of its corresponding synapse. This combined weighted input is then used to evaluate that neuron's threshold function, which is then used to generate the neuron's output. In this manner, data can be propagated back and forth between the neurons. In accordance with principles of the invention, the weighting functionality is applied directly to SYNAPSE objects, where a NEURON comprises a specialized Collection of SYNAPSE objects.

Neural networks learn input/output relationships through training. Generally, there are two types of training used in neural networks: supervised, which is most common, and unsupervised. In supervised learning, the network user assembles a set of training data. The training data contains examples of inputs together with corresponding outputs, and the network learns to infer the relationships between the two. Training data is often derived from historical records and the like.

Under supervised learning, the neural network is trained using a supervised learning algorithm, such as back propagation, which uses feedback to adjust the networks weights and thresholds so as to minimize the error in its predictions on the training set. If the network is properly trained, it has then learned to model the (unknown) function that relates the input variables to the output variables, and can subsequently be used to make predictions where the output is not known. Further details of neural networks are known to those skilled in the neural network art, and thus are not enclosed herein.

Implementation a neural network using the OLIN interpreter and symbolic language proceeds as follows. The programmer defines the neurons and synapses for each layer, providing an initial threshold function and weight for each SYNAPSE object. The training algorithm may be defined by a combination of procedural logic in the OLIN program (e.g., for back propagation) and/or reprogrammable functions (methods) exposed by the SYNAPSE objects.

Figure 22:
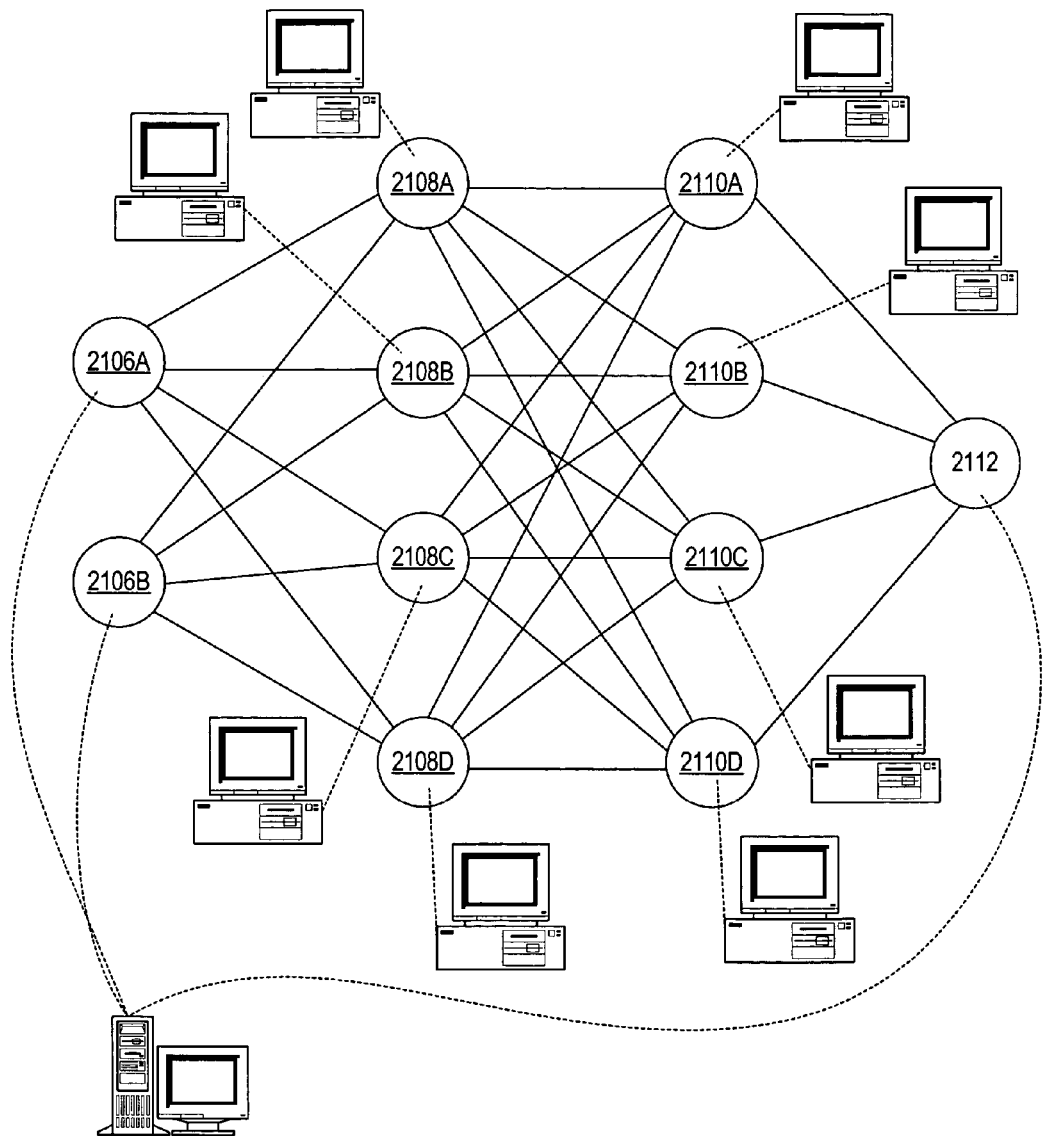
FIG. 22 is a schematic diagram of a distributed networked resource execution environment for implementing the neural network of FIG. 12.

From an execution standpoint, a neural network may be implemented on a single computer having a single processor, on a single computer system having multiple processors, or via a distributed network of computers. Under the multiple processor or distributed processing execution environments, each neuron may be assigned to a respective processing resource (i.e., processor or network node), or selected neurons may be assigned to particular processors or network node. For example, an exemplary distributed computing environment for implementing the neural network of FIG. 21 is shown in FIG. 22, wherein each neuron in hidden layer 2102 is assigned to a respective computer, while a single computer is used for all of the input and output nodes.

Exemplary Computer System for Implementing the Invention

Figure 23:
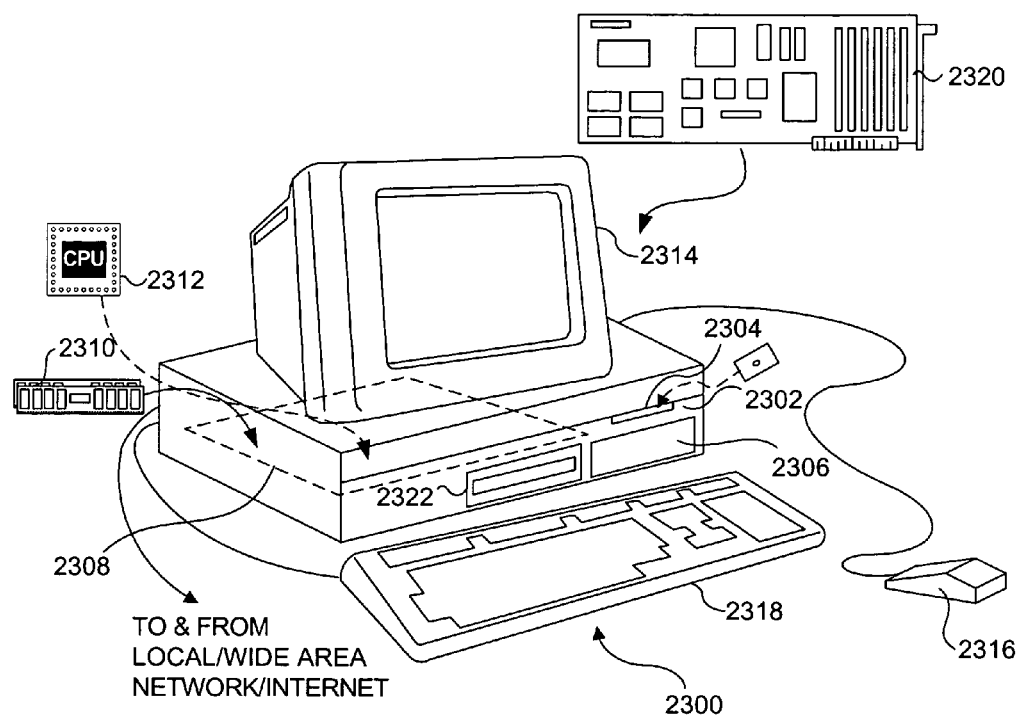
FIG. 23 is a schematic diagram of an exemplary computer system by which aspects of the invention may be practiced.

With reference to FIG. 23, a generally conventional computer 2300 is illustrated, which is suitable for use as stand alone computers, clients, and servers in connection with practicing the present invention. Examples of computers that may be suitable for these operations include PC-class systems operating the one of various Microsoft Windows operating systems, workstations operating various UNIX-based operating system, Apple Macintosh computers, and various computer architectures on which LINUX operating systems may be run. Computer 2300 is also intended to encompass various server architectures, as well as computers having multiple processors.

Computer 2300 includes a processor chassis 2302 in which are mounted a floppy disk drive 2304, a hard drive 2306, a motherboard 2308 populated with appropriate integrated circuits including memory 2310 and one or more processors (CPUs) 2312, and a power supply (not shown), as are generally well known to those of ordinary skill in the art. It will be understood that hard drive 2306 may comprise a single unit, or multiple hard drives, and may optionally reside outside of computer 2300. A monitor 2314 is included for displaying graphics and text generated by software programs and program modules that are run by the computer. A mouse 2316 (or other pointing device) may be connected to a serial port (or to a bus port or USB port) on the rear of processor chassis 2302, and signals from mouse 2316 are conveyed to the motherboard to control a cursor on the display and to select text, menu options, and graphic components displayed on monitor 2314 by software programs and modules executing on the computer. In addition, a keyboard 2318 is coupled to the motherboard for user entry of text and commands that affect the running of software programs executing on the computer. Computer 2300 also includes a network interface card 2320 or built-in network adapter for connecting the computer to a computer network, such as a local area network, wide area network, or the Internet.

Computer 2300 may also optionally include a compact disk-read only memory (CD-ROM) drive 2322 into which a CD-ROM disk may be inserted so that executable files and data on the disk can be read for transfer into the memory and/or into storage on hard drive 2306 of computer 2300. Other mass memory storage devices such as an optical recorded medium or DVD drive may be included. The machine instructions comprising the software that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

APPENDIX

OLIN Root Methods

The following paragraphs contain a list of exemplary built-in methods provided by one embodiment of the OLIN Interpreter. This list is not meant to be limiting, and the methods included herein are illustrative of methods that may be provided in an implementation of the Interpreter. In general, the syntax of function these and other OLIN methods are similar to Common Lisp definitions, such as those defined in the book "Common Lisp" by Patrick Henry Winston.

Selector/Searcher Methods
  Car
    If object is a symbol, returns the symbol. If the object is a list, returns the first element of the list.
  Cdr
    If object is a symbol, returns the attributes of the symbol. If object is a list, returns the tail of the list.
  Nth
    Returns the Nth element of a list. N=0 is the first element of the list.
  NthCdr
    Returns the Nth tail of the list.
  Last
    Returns the last element of a list.
  Length
    Returns the integer length of a list.
  Count
    Returns the integer number of elements matching a predicate.
  Mismatch
    Returns the ordinal of the first mismatch that occurs when comparing a list of lists.
  Member
    Returns the tail of the list following the first occurrence in the list of an object matching the predicate specified.
  Find
    Returns the object in a list matching the predicate specified.
  Position
    Returns the ordinal of the object in a list matching the predicate.

Constructor Methods
  Identity
    Returns the object itself.
  Cons
    Creates a CONS object who's CAR cell and CDR cell point to the objects specified.
  Copy
    Returns a copy of the object specified.
  CopyAppend
    Returns an object that is a copy of the appended lists specified. The class of the list last specified determines the class of the new list.
  CopyFirstN
    Returns a copy of the list specified that includes the first N elements of the source list.
  CopyLastN
    Returns a copy of the list specified that includes the last N elements source list.
  CopySublist
    Returns a copy of the list specified that includes the elements of the sub-list specified.
  Copy Reverse
    Returns a copy of the list specified with the elements of the list reversed.
  CopyRemove
    Returns a copy of the list specified excluding the elements matching the predicate specified.
  CopyRemoveDuplicates
    Returns a copy of the list with duplicate elements removed.
  MkUnion
    Returns a new list containing the union of two specified lists. The class of the new object is inherited from the last list specified.

MkIntersection
  Returns a new list containing the intersection of two lists specified. The class of the last list specified determines the class of the new object.
MkSetDifference
  Returns a new list containing those elements in the second list that are not contained in the first list. The class of the second list determines the class of the new list.
MkInstance
  Returns a new instance of a particular class.
MkPersistent
  Makes an object persistent by storing the instances on a classes' instance list. Subsequently, these instances may be accessed by an index number.
Modifier Methods
  Replace
  ReplaceCar
    Replaces a lists Car with the specified object.
  ReplaceCdr
    Replaces a lists Cdr cell with the specified object.
  ReplaceEach
    Replaces each of the list elements that matches the predicate specified with the object specified.
  Truncate
    Truncate the list at the specified position.
  Reverse
    Replace the list with a list containing the elements in reverse.
  Delete
    Delete the objects matching the specified predicate from the list.
  DeleteDuplicates
    Delete duplicate elements from the list.
  Cat
    Replaces the first list with the concatenation of the lists specified. Each of the specified lists is altered.
  Merge
    Merges the contents of two lists using the test predicate specified. The merge is stable.
  Sort
    Sorts the specified list using the predicate specified. The sort is stable.
  Push
    Pushes a specified object onto the head of a list.
  Pop
    Pops the head of the specified list from the list and returns it.
Recognizer Methods
  Null
    Returns True if an object is the NIL object.
  True
    Returns True if the object is not the NIL object.
  ClassP
    Returns the Object if it is a class, otherwise, returns the NIL object.
  InstanceP
    Returns the Object if is an instance of the specified class, otherwise returns the NIL object.
  SymbolP
    Returns the object if it is a symbol, otherwise returns the NIL object.
  NumberP
    Returns the TRUE object if the object is a number, otherwise returns the NIL object.
  IntegerP
    Returns the TRUE object if the object is an Integer, otherwise returns the NIL object.
  RationalP
    Returns the TRUE object if the object is a Rational Number, otherwise returns the NIL object.
  ListP
    Returns the object if it is a list otherwise returns the NIL object.
Comparator Methods
  Eq
  Neq
  Eql
  Neql
  Equal
  Nequal
Logical Methods
  Not
  And
  Or
Assignment Methods
  Set
  Setq
  Psetq
  Setf
Attribute Methods
  PutAttribute
  GetAttribute
  RemoveAttribute
  ClearAttributes
  CopyAttributes
Method Definition Methods
  DefMethod
String and Character Manipulation Methods
Numerical Methods
  Selector Methods
  Recognizer Methods
  Comparator Methods
  Arithmetic Methods
  Irrational and Transcendental Methods
  Bitwise Operation Methods
  Random Number Methods
Evaluation Methods
  Recognizer Methods
  Method Application Methods
  Macro Expansion Methods
  Method Mapping Methods
  Method Mapping Predicate Methods

What is claimed is:

1. A method comprising:
  parsing an XML document comprising at least a portion of a computer program including original data and code written in an object-oriented XML-based symbolic computer language providing built-in structures and functions for supporting neural networks, including neuron objects and synapse objects, to extract symbolic expressions embedded within the XML document;
  evaluating the symbolic expressions to execute the at least a portion of the computer program, the evaluating including,
    scanning a symbolic expression and creating an object or collection of objects that represents the terms of the expression;

for at least one symbolic expression associating a neuron object with a collection of synapse objects, each synapse object having a weighted value;

for each object or collection of objects,
executing a method explicitly specified in the symbolic expression to be performed on the object or collection of objects if such method is specified;
otherwise
executing a default method if no method is explicitly specified,
wherein execution of a method for at least one neuron object includes evaluating the collection of synapse objects associated with the neuron object to update a value of the neuron object; and
outputting a result of at least one evaluated symbolic expression, the result comprising a data output,
wherein the object-oriented XML-based symbolic computer language is an interpretive language based on inherent principles of the LISP programming language under which code and data are interchangeable.

2. The method of claim 1, further comprising;
dynamically reprogramming at least one symbolic expression;
re-evaluating said at least one symbolic expression.

3. The method of claim 2, wherein said at least one symbolic expression is dynamically reprogrammed and re-evaluated in a recursive manner.

4. The method of claim 1, wherein the XML document is parsed and the symbolic expressions are evaluated by an interpreter.

5. The method of claim 1, wherein the symbolic expressions are evaluated using a plurality of computing resources.

6. The method of claim 5, wherein the plurality of computing resources comprises a plurality of distributed computers connected via a computer network.

7. The method of claim 5, wherein the computer program is executed on a single computer having a plurality of processors.

8. The method of claim 1, wherein said XML-based symbolic computer language includes fundamental support for genetic programming procedures.

9. The method of claim 1, further comprising determining a default method for an objection or collection by iterating through a class hierarchy associated with the object or collection until a default method is found.

10. A method comprising:
parsing, at a first computing resource, an XML document comprising a portion of a computer program written in an XML-based object-oriented symbolic computer language providing built-in structures and functions for supporting neural networks, including neuron objects and synapse objects to extract symbolic expressions embedded within the XML document, said symbolic expressions defining objects and methods operating on those objects;
identifying a first reference, in an extracted symbolic expression, to one or more remote objects or a method or methods operating on the one or more remote objects;
identifying a second computing resource associated with the first reference;
sending a first collection of objects and methods including at least one object and at least one method from the first computing resource to the second computing resource;
receiving, at the first computing resource, a first result of processing operations performed on the second computing resource pertaining to the first collection of objects and methods, the first result comprising data resulting from,
associating a first neuron object with a first collection of synapse objects, each synapse object having a weighted value; and
evaluating the first collection of synapse objects to update a value of the first neuron object;
identifying a second reference, in an extracted symbolic expression, to one or more remote objects or a method or methods operating on the one or more remote objects;
identifying a third computing resource associated with the second reference;
sending a second collection of objects and methods including at least one object and at least one method from the first computing resource to a third computing resource; and
receiving, at the first computing resource, a second result of processing operations performed on the third computing resource pertaining to the second collection of objects and methods, the second result comprising data resulting from,
associating a second neuron object with a second collection of synapse objects, each synapse object having a weighted value; and
evaluating the second collection of synapse objects to update a value of the second neuron object;
wherein the object-oriented XML-based symbolic computer language is an interpretive language based on inherent principles of the LISP programming language under which code and data are interchangeable.

11. The method of claim 10, wherein the first and second computing resources comprise respective computers linked in communication via a computer network.

12. The method of claim 10, wherein the first and second computing resources comprise first and second processors in a multiprocessor computer system.

13. The method of claim 10, further comprising employing a process management facility to manage concurrent process execution in a multiprocessing environment.

14. The method of claim 10, further comprising:
performing processing operations on the second computing resource pertaining to the first collection of objects and methods.

15. An article of manufacture comprising a machine-readable medium having a plurality of instructions tangibly stored thereon comprising an interpreter for an object-oriented XML-based symbolic computer language providing built-in structures and functions for supporting neural networks, including neuron objects and synapse objects, which when executed perform operations including:
interpreting an XML document comprising a computer program including code and data written in the XML-based symbolic computer language by,
parsing the XML document to extract symbolic expressions embedded within the XML document; and
evaluating the symbolic expressions that are extracted by,
scanning a symbolic expression and creating an object or collection of objects that represents the terms of the expression;
for at least one symbolic expression associating a neuron object with a collection of synapse objects, each synapse object having a weighted value;
for each object or collection of objects,
executing a method explicitly specified in the symbolic expression to be performed on the object or collection of objects if such method is specified;
otherwise
executing a default method if no method is explicitly specified, wherein execution of a method for at least one neuron object includes evaluating the collection of synapse objects associated with the neuron object to update a value of the neuron object; and outputting a result of at least one evaluated symbolic expression, the result comprising a data output, wherein the object-oriented XML-based symbolic computer language is an interpretive language based on inherent principles of the LISP programming language under which code and data are interchangeable.

16. The article of manufacture of claim 15, wherein the object-oriented XML-based symbolic computer language provides built-in structures and functions for supporting neural networks.

* * * * *